US010917286B2

(12) United States Patent
Kitabatake

(10) Patent No.: US 10,917,286 B2
(45) Date of Patent: Feb. 9, 2021

(54) CONTROL METHOD AND INFORMATION PROCESSING APPARATUS

(71) Applicant: CANON KABUSHIKI KAISHA, Tokyo (JP)

(72) Inventor: Nobuhiro Kitabatake, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/518,624

(22) Filed: Jul. 22, 2019

(65) Prior Publication Data
US 2020/0036572 A1 Jan. 30, 2020

(30) Foreign Application Priority Data

Jul. 30, 2018 (JP) ................... 2018-142386

(51) Int. Cl.
*H04L 29/08* (2006.01)
*H04L 12/24* (2006.01)
*G06Q 30/06* (2012.01)

(52) U.S. Cl.
CPC ......... *H04L 41/06* (2013.01); *G06Q 30/0621* (2013.01); *G06Q 30/0633* (2013.01); *G06Q 30/0603* (2013.01); *G06Q 30/0641* (2013.01)

(58) Field of Classification Search
CPC ................................ H04L 41/06; G06Q 40/02
See application file for complete search history.

(56) References Cited

U.S. PATENT DOCUMENTS

2005/0129010 A1* 6/2005 Maeda .................... H04L 67/34
370/389
2015/0146242 A1* 5/2015 Tsujimoto ............. G06F 3/1236
358/1.15
2017/0187892 A1 6/2017 Abe

FOREIGN PATENT DOCUMENTS

JP 2017-117410 A 6/2017

* cited by examiner

*Primary Examiner* — Adnan M Mirza
(74) *Attorney, Agent, or Firm* — Canon U.S.A, Inc. IP Division

(57) ABSTRACT

A method for controlling an information processing apparatus includes setting a communication retry condition according to a type of a user operation, and performing communication based on the user operation. If communication based on the user operation has failed, a communication retry is performed based on the set communication retry condition.

16 Claims, 24 Drawing Sheets

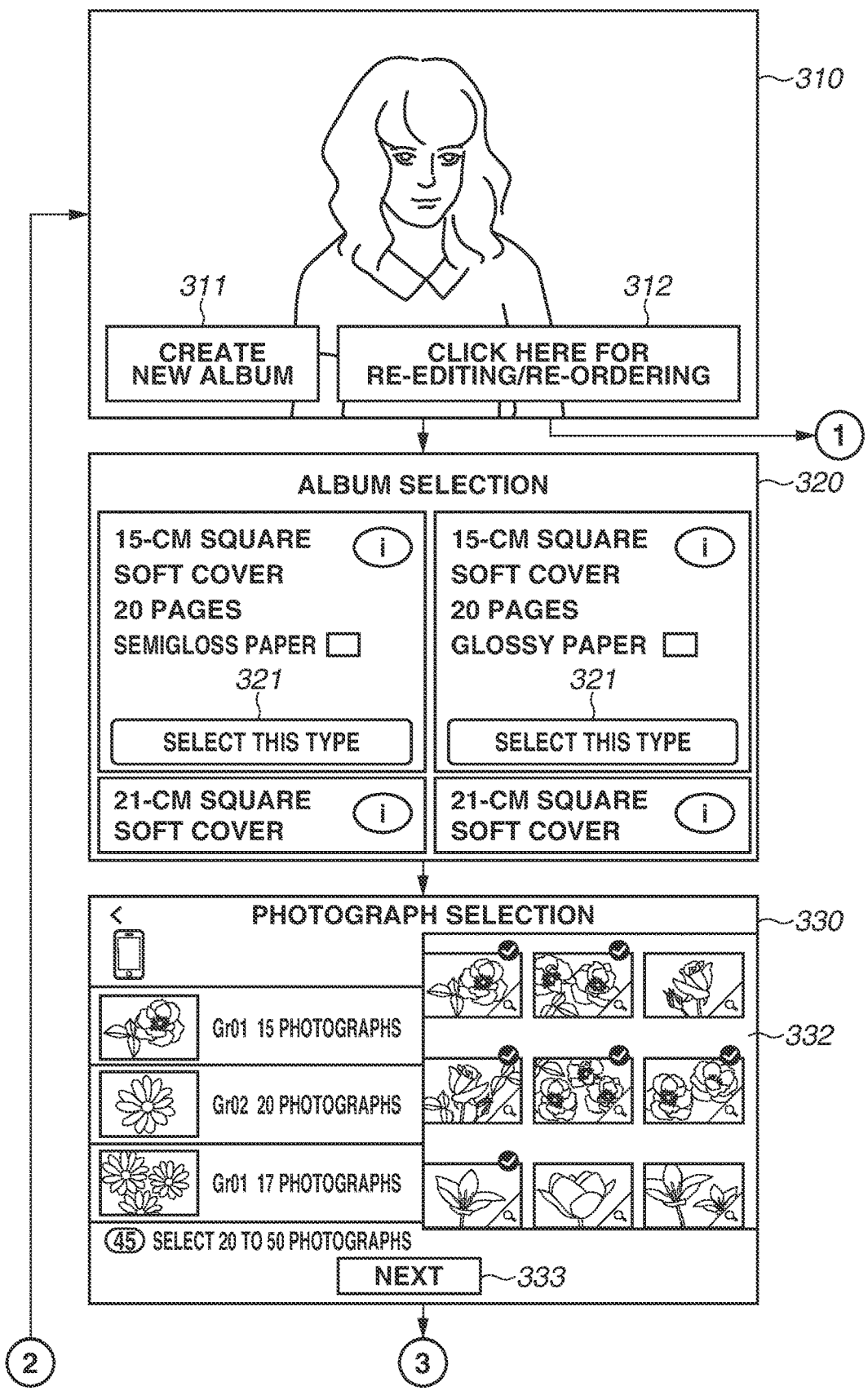

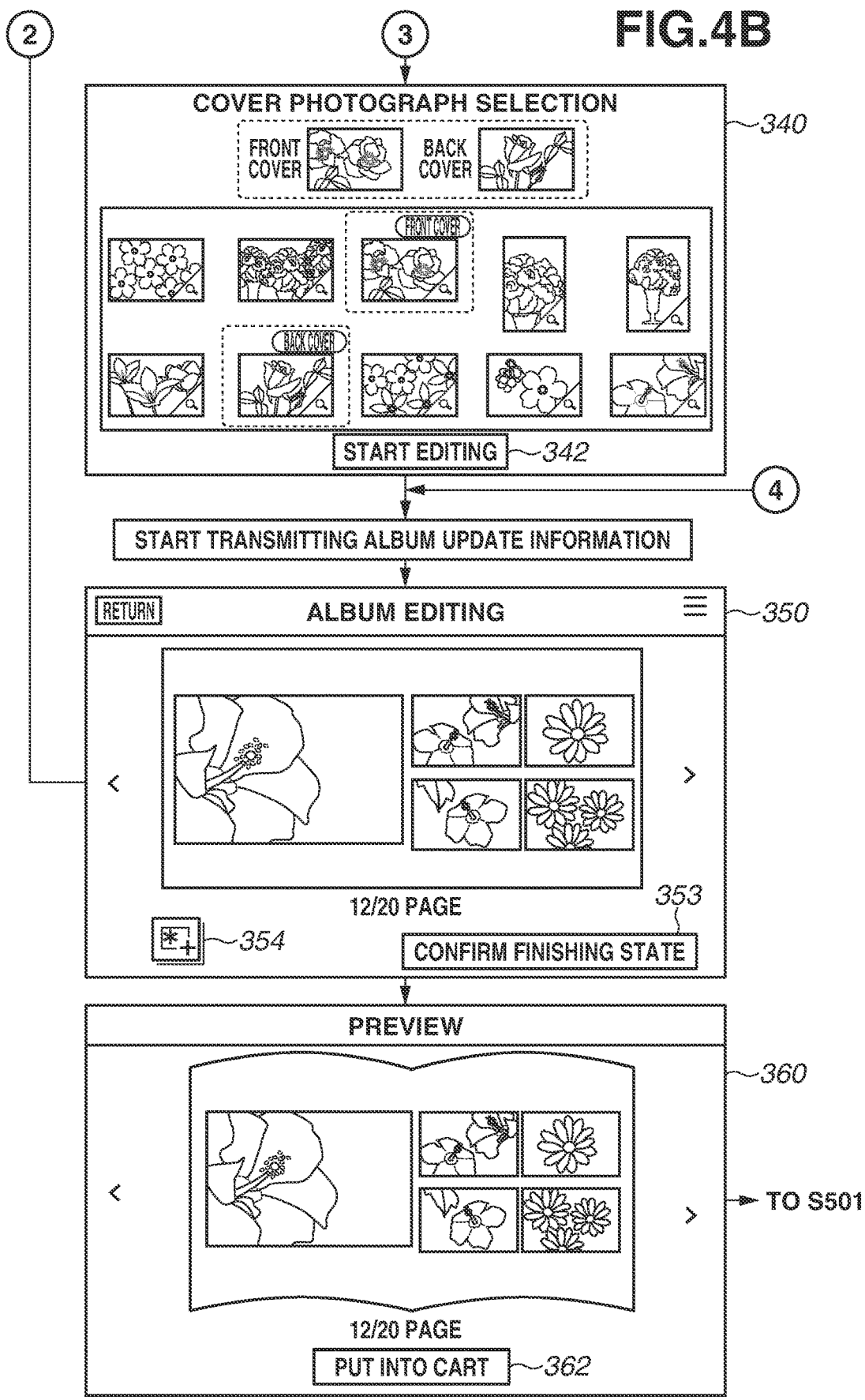

FIG.6

| No. | COMMUNICATION PROCESSING TYPE | OVERVIEW OF COMMUNICATION CONTENT | EFFECT ON USER WHEN COMMUNICATION IS DISABLED | DEGREE OF EFFECT |
|---|---|---|---|---|
| 1 | ALBUM UPLOAD URL ACQUISITION | REQUESTING THE MANAGEMENT SYSTEM TO PREPARE THE ALBUM UPLOAD URL AND ACQUIRE THE URL | AN ERROR MESSAGE IS DISPLAYED AND THE PREVIEW SCREEN IS REDISPLAYED | LOW |
| 2 | ALBUM DATA UPLOADING | UPLOADING THE ALBUM DATA | SAME AS ABOVE | LOW |
| 3 | SHOPPING CART URL ACQUISITION | ACQUIRING THE SHOPPING CART URL TO BE DISPLAYED IN THE WEB BROWSER | SAME AS ABOVE | LOW |
| 4 | ALBUM UPDATE INFORMATION TRANSMISSION | TRANSMITTING THE ALBUM UPDATE INFORMATION RELATED TO THE PUSH NOTIFICATION ASSOCIATION | A PUSH NOTIFICATION UNSUITABLE FOR THE USER WILL BE TRANSMITTED DEPENDING ON THE TYPE OF INFORMATION UNABLE TO BE TRANSMITTED. NO ERROR MESSAGE IS DISPLAYED EVEN IF TRANSMISSION FAILED. | HIGH |

FIG.8

|  | RETRY INTERVAL [SEC] | NUMBER OF RETRIES |
|---|---|---|
| COMMUNICATION SETTING 1 | 0.5 | 3 |
| COMMUNICATION SETTING 2 | 3 | 20 |

FIG.9A

| No. | USER OPERATION AT UPDATE INFORMATION TRANSMISSION | NUMBER OF ALBUMS UNDER EDITING AFTER USER OPERATION | DATE/TIME OF ALBUM OPERATED | DATE/TIME RECORDED IN THE MANAGEMENT SYSTEM? | EFFECT ON USER | DEGREE OF EFFECT |
|---|---|---|---|---|---|---|
| 1 | START EDITING/RE-EDITING | — | — | × | NO PUSH NOTIFICATION IS DELIVERED ALTHOUGH THERE IS AN ALBUM UNDER EDITING | LOW |
| 2 | START EDITING/RE-EDITING | — | — | ○ | A PUSH NOTIFICATION IS DELIVERED ALTHOUGH A SPECIFIED TIME PERIOD HAS NOT ELAPSED SINCE EDITING ENDS | MIDDLE |
| 3 | DELETE | — | — | × | — | NONE |
| 4 | DELETE | ZERO | — | ○ | A PUSH NOTIFICATION "ALBUM UNDER EDITING IS PRESENT" IS DELIVERED ALTHOUGH THERE IS NO ALBUM UNDER EDITING | HIGH |
| 5 | DELETE | ONE OR MORE | WHEN AN ALBUM OTHER THAN AN ALBUM UNDER EDITING HAVING THE LATEST UPDATE DATE/TIME IS DELETED | ○ | — | NONE |
| 6 | DELETE | ONE OR MORE | WHEN AN ALBUM UNDER EDITING HAVING THE LATEST UPDATE DATE/TIME IS DELETED | ○ | A PUSH NOTIFICATION IS DELIVERED ALTHOUGH A SPECIFIED TIME PERIOD HAS NOT ELAPSED SINCE EDITING ENDS | MIDDLE |
| 7 | PUT INTO CART | — | — | × | — | NONE |
| 8 | PUT INTO CART | ONE OR MORE | — | ○ | A PUSH NOTIFICATION IS DELIVERED ALTHOUGH A SPECIFIED TIME PERIOD HAS NOT ELAPSED SINCE EDITING ENDS | MIDDLE |
| 9 | PUT INTO CART | ZERO | — | ○ | A PUSH NOTIFICATION "ALBUM UNDER EDITING IS PRESENT" IS DELIVERED ALTHOUGH THERE IS NO ALBUM UNDER EDITING | HIGH |

FIG.9B

| No. | USER OPERATION AT UPDATE INFORMATION TRANSMISSION | EFFECT ON USER | DEGREE OF EFFECT |
| --- | --- | --- | --- |
| 1 | START EDITING/RE-EDITING | A PUSH NOTIFICATION MAY BE DELIVERED ALTHOUGH A SPECIFIED TIME PERIOD HAS NOT ELAPSED SINCE EDITING ENDS | MIDDLE |
| 2 | DELETE | A PUSH NOTIFICATION "ALBUM UNDER EDITING IS PRESENT" MAY BE DELIVERED ALTHOUGH THERE IS NO ALBUM UNDER EDITING | HIGH |
| 3 | PUT INTO CART | A PUSH NOTIFICATION "ALBUM UNDER EDITING IS PRESENT" MAY BE DELIVERED ALTHOUGH THERE IS NO ALBUM UNDER EDITING | HIGH |

FIG.11

|  | RETRY INTERVAL [SEC] | NUMBER OF RETRIES |
|---|---|---|
| COMMUNICATION SETTING 1 | 0.5 | 0 |
| COMMUNICATION SETTING 2 | 0.5 | 3 |
| COMMUNICATION SETTING 3 | 3 | 20 |
| COMMUNICATION SETTING 4 | 3 | 30 |

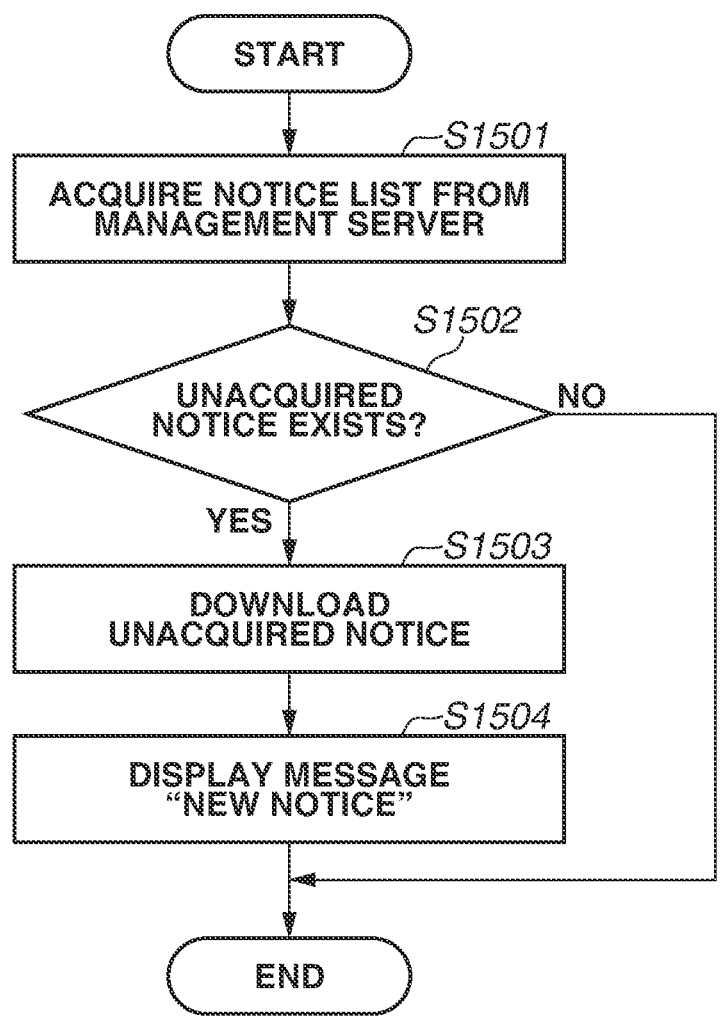

FIG.19

| No. | COMMUNICATION PROCESSING TYPE | OVERVIEW OF COMMUNICATION CONTENT | EFFECT ON USER WHEN COMMUNICATION IS DISABLED | DEGREE OF EFFECT |
|---|---|---|---|---|
| 1 | ALBUM UPLOAD URL ACQUISITION | REQUESTING THE MANAGEMENT SYSTEM TO PREPARE THE ALBUM UPLOAD URL AND ACQUIRE THE URL | AN ERROR MESSAGE IS DISPLAYED AND THE PREVIOUS SCREEN IS REDISPLAYED | LOW |
| 2 | ALBUM DATA UPLOADING | UPLOADING THE ALBUM DATA | SAME AS ABOVE | LOW |
| 3 | SHOPPING CART URL ACQUISITION | ACQUIRING THE SHOPPING CART URL TO BE DISPLAYED IN THE WEB BROWSER | SAME AS ABOVE | LOW |
| 4 | NOTICE LIST ACQUISITION | ACQUIRING A NOTICE LIST IN THE BACKGROUND | UNABLE TO NOTIFY THE USER OF SUCH A NOTICE AS SERVER DEACTIVATION INFORMATION AND FAILURE INFORMATION | HIGH |
| 5 | NOTICE DOWNLOADING | ACQUIRING NOTICE DATA IN THE BACKGROUND | SAME AS ABOVE | HIGH |
| 6 | ACQUIRE THE LAST UPDATE DATE/TIME OF THE STAMP DATA | ACQUIRING THE LAST UPDATE DATE/TIME OF THE STAMP DATA IN THE BACKGROUND | THE USER CANNOT RECOGNIZE THAT THE STAMP WAS UPDATED | MIDDLE |
| 7 | ACQUIRE STAMP LIST | ACQUIRING A CATEGORY LIST OF STAMPS DOWNLOADABLE TO THE MANAGEMENT SYSTEM IN THE BACKGROUND | THE USER CANNOT RECOGNIZE THAT THE STAMP WAS UPDATED | MIDDLE |
| 8 | STAMP DOWNLOADING | DOWNLOAD UNDOWNLOADED STAMPS | AN ERROR MESSAGE IS DISPLAYED AND THE PREVIOUS SCREEN IS REDISPLAYED | LOW |

CONTROL METHOD AND INFORMATION PROCESSING APPARATUS

BACKGROUND

Field of the Disclosure

The present disclosure relates to a control method and an information processing apparatus.

Description of the Related Art

Electronic commerce (EC) sites and services for selling products via the Internet and other communication networks have been widespread. In this type of service, a user usually accesses a shopping site by using a terminal apparatus, such as a personal computer and a smartphone. Then, a catalog of products offered by the site is displayed on the user's terminal apparatus. The user refers to the displayed catalog and registers desired products into the shopping cart for electronic commerce. Then, the user makes payment to place an order. According to the order from the user, the commodity supplier managing the shopping site ships the corresponding products to the specified shipping address.

In addition to services for ordering ready-made articles, there is a service for creating a photo album on a user's terminal apparatus by using a photo album creation application and placing an order online (refer to Japanese Patent Application Laid-Open No. 2017-117410).

SUMMARY

According to an aspect of some embodiments, a control method includes setting a communication retry condition to a computer of an information processing apparatus according to a type of a user operation, and performing communication based on the user operation. If communication based on the user operation has failed, a communication retry is performed based on the set communication retry condition.

Further features of various embodiments will become apparent from the following description of exemplary embodiments with reference to the attached drawings.

BRIEF DESCRIPTION OF THE DRAWINGS

FIG. 6 is a table illustrating the degree of effect when various communications are disabled.

FIG. 8 is a table illustrating communication settings set through the communication parameter setting.

FIGS. 9A and 9B are tables illustrating the degree of effect when various communications are disabled.

FIG. 11 is a table illustrating communication settings set through the communication parameter setting.

FIG. 15 is a flowchart illustrating notice acquisition.

FIG. 19 is a table illustrating the degree of effect when various communications are disabled.

DESCRIPTION OF THE EMBODIMENTS

Figure 1:
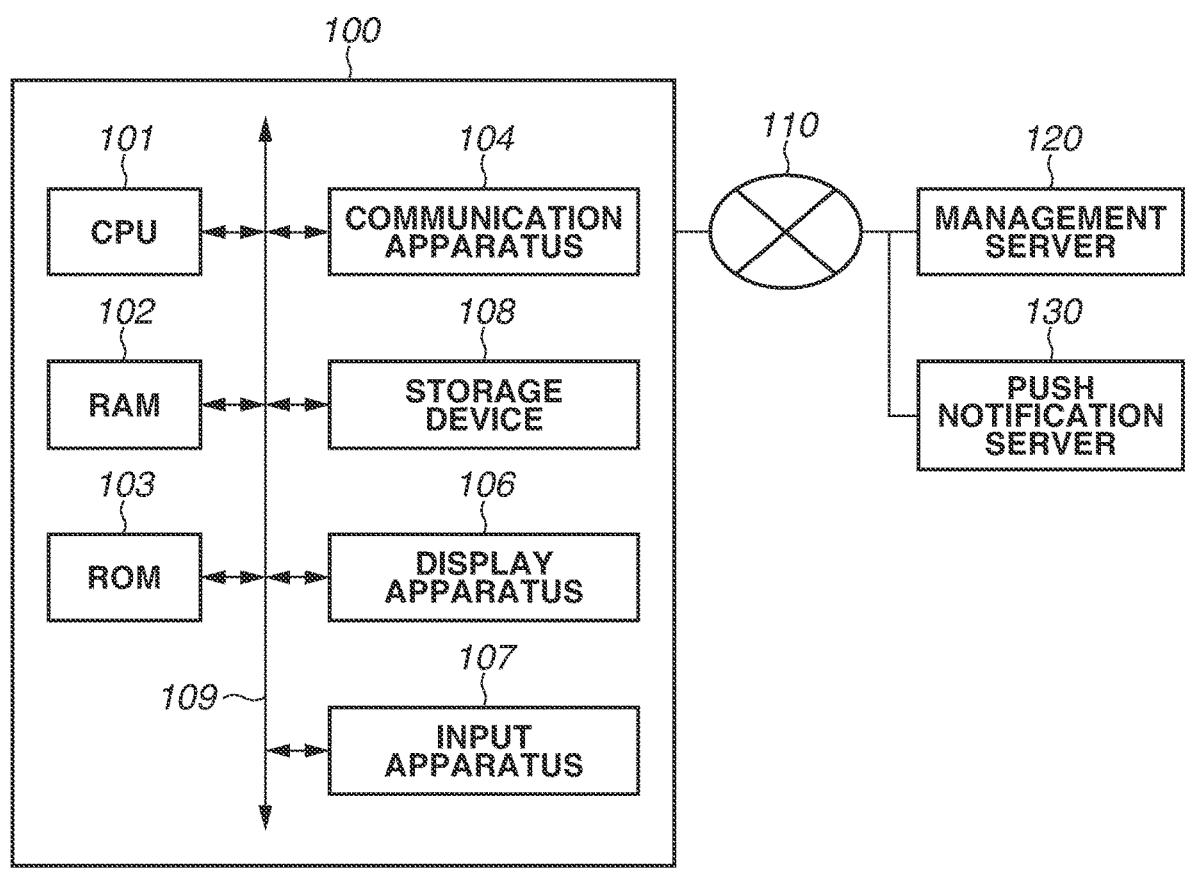
FIG. 1 illustrates a configuration of an information processing system.

When a user places an order via a network, such as the Internet, the user may be unable to send required information from the user's terminal apparatus to a commodity supplier's server because of a network trouble. In such a case, the terminal apparatus may possibly retry communication until required information is transmitted. However, if the terminal apparatus repeatedly retries until communication is successfully established, the resource of the terminal apparatus will be consumed by the retry processing itself, which accompanies battery consumption.

Some embodiments suitably perform communication processing in the event that network communication is temporarily disabled because of a network trouble.

Exemplary embodiments will be described below with reference to the accompanying drawings. The following exemplary embodiments do not limit all embodiments according to the appended claims. Not all of the combinations of the features described in the exemplary embodiments are essential for a method for solving the problems in all embodiments.

A first exemplary embodiment will be described below. The present exemplary embodiment will be described below based on an example in which, by using an album creation application, a user creates data for a photo album (photo book) and places an order.

<Overview of Entire System>

An information processing system according to the present exemplary embodiment will be described below with reference to FIG. 1. The information processing system includes a smartphone 100 as a terminal used by the user, a management server 120 of a company which manages photo album orders and creates photo albums, and a push notification server 130. These apparatuses are connected via a network 110, such as the Internet.

An album creation application is installed in the smartphone 100. Using the album creation application, the user is able to create data for a photo album (hereinafter also simply referred to as an "album") based on image data such as photographs. Although, in the present exemplary embodiment, the smartphone 100 is described as an example of an information processing apparatus indicating the user's terminal, a personal computer (PC) and a tablet computer are also applicable. Via the network 110, such as the Internet, the smartphone 100 can upload album data to the management server 120 and transmit, to the management server 120, operation information about the user's operations on the album creation application.

The management server 120 performs payment processing and album creation processing based on the album data transmitted from the smartphone 100. The management server 120 also determines whether to send a predetermined notification to the smartphone 100 based on the operation information. The determination processing will be described in detail below with reference to FIGS. 7A and 7B. Examples of notifications to the smartphone 100 include push notifications, E-mails, and any other methods for transmitting a notification on a user basis (on a smartphone basis). Examples will be described below centering on push notifications. A push notification is a notification method in which the user's information processing apparatus notifies the user of information in real time in cooperation with an external server. The use of push notifications enables a push notification distributor to notify the user's information processing apparatus of information associated with an application even if the application is not activated. For example, to use push notifications with the Android® operating system (OS), Firebase Cloud Messaging (FCM) is available as a method for using a dedicated push notification distribution server. Likewise, to use push notifications with iOS, Apple Push Notification Service (APNs) is available as a method for using a dedicated push notification distribution server.

Other known general techniques for enabling push notifications include Long Polling, Web Socket, and Server-sent events. These techniques enable the push notification distributor to transmit a notification to the user's information processing apparatus in real time at a timing intended by the distributor.

When the management server 120 determines to perform notification, the management server 120 transmits a push notification request to the push notification server 130 (push notification distribution server). The push notification server 130 transmits a push notification to a specified terminal (smartphone 100) according to the content of the push notification request. Upon receipt of the push notification, the smartphone 100 displays information according to the received push notification.

<Configuration of Smartphone 100>

The smartphone 100 as an information processing apparatus includes a central processing unit (CPU) 101, a read only memory (ROM) 103, a random access memory (RAM) 102, a display apparatus 106, an input apparatus 107, and a communication apparatus 104, which are all connected to each other via a system bus 109.

The CPU 101 controls the entire smartphone 100 by executing the operating system program (hereinafter abbreviated to an OS) stored in a storage device 108, the ROM 103, and the RAM 102. The CPU 101 executes each program stored in the ROM 103 and the RAM 102 to implement each functional configuration of the smartphone 100 and perform information calculation and processing. The ROM 103 stores programs. The RAM 102 is used as a work memory for the CPU 101 and a temporary storage area for various data. Processing of each flowchart (described below) is implemented when the program of the album creation application stored in the storage device 108 is loaded into the RAM 102 and then executed by the CPU 101.

The display apparatus 106 is a display unit for displaying image information output from the smartphone 100. The input apparatus 107, such as a touch panel and a keyboard, is used by the user to input information to the smartphone 100. The storage device 108, such as a flash memory and a solid state drive (SSD), stores image data and templates.

According to the present exemplary embodiment, the storage device 108 stores the album creation application (described below).

Although the smartphone 100 includes the display apparatus 106, the input apparatus 107, and the storage device 108, as illustrated in FIG. 1, the present exemplary embodiment is not limited thereto. The smartphone 100 does not need to include all of the above-described apparatuses. These apparatuses may be external apparatuses connected to the smartphone 100.

The communication apparatus 104, a communication device including a wireless-communication circuit and an antenna, is communicably connected to a wireless base station (not illustrated) connected to a public network via a wireless communication circuit. In addition, the communication apparatus 104 may perform not only communication to a public network but also communication according to the wireless communication method for wireless local area network (LAN) conforming to the IEEE 802.11 standard series. The communication apparatus 104 is communicably connected to the management server 120 and the push notification server 130 via a wireless LAN and a public network.

<Configuration of Management Server 120 and Push Notification Server 130>

The management server 120 and the push notification server 130 are information processing apparatuses having a similar hardware configuration to that of the smartphone 100. More specifically, each of the management server 120 and the push notification server 130 includes a CPU, a RAM, a ROM, a communication apparatus, a storage device, a display apparatus, and an input apparatus, which are connected to each other via the system bus 109. The hardware configuration of each of the management server 120 and the push notification server 130 is similar to that of the smartphone 100, so that detailed descriptions thereof will be omitted. However, the management server 120 may include a plurality of information processing apparatuses. The management server 120 is connected to a printer (not illustrated) via the communication apparatus. Upon receipt of an order for a photo album, the management server 120 instructs the printer to perform printing. The management server 120 is also connected to the push notification server 130 via a network. The push notification server 130 may include a plurality of information processing apparatuses.

<Photo Album Ordering Flow>

Figure 2:
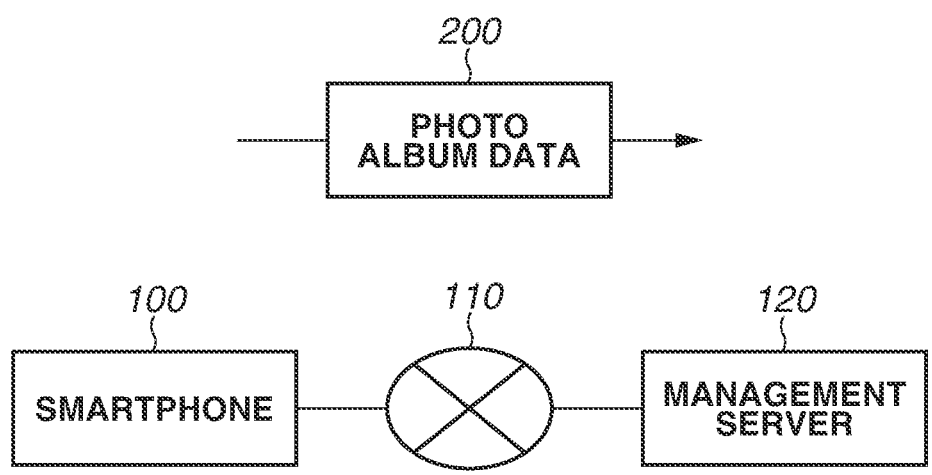
FIG. 2 illustrates a flow of album creation and ordering.

A flow of ordering a photo album will be briefly described below with reference to FIG. 2. A user as a customer creates photo album data 200 by using the album creation application of the smartphone 100. The created photo album data 200 is transmitted to the management server 120 via the network 110, such as the Internet. The photo album data 200 includes photographs used by the user, layout information, and associated information, such as a binding style and a paper type. Order-related information (user's name, address, telephone number, shipping address, etc.) related to ordering an album is also transmitted to the management server 120. Upon receipt of the photo album data 200 via the network 110, the management server 120 instructs the printer to perform printing. Based on the photo album data 200, the printer performs printing on a medium, such as paper, and creates a photo album. When a photo album is created, the photo album is delivered to the customer by using a physical delivery method, such as parcel delivery service, based on the order-related information.

The payment method for a photo album is not limited to a particular method. After creating the photo album data 200 and sending it to the management server 120, the customer may make payment by using an electronic payment system or bank transfer. The delivery method is not limited to a particular method, either. The customer may go to a photo album production company to receive the photo album, or receive the photo album via a retail photo album production company having a partnership with the photo album production company.

Although, in the above-described example, the management server 120 directly accepts an order and instructs the printer to perform printing, the configuration is not limited thereto. For example, an order management server and a printing management server may be provided in addition to the management server 120. In this case, the order management server accepts an order from a user and transmits order-related information (user's name, address, telephone number, shipping address, etc.) related to ordering an album to the management server 120. Upon receipt of photo album data 200 separately transmitted from the smartphone 100, the management server 120 manages, as order information, the user's order-related information transmitted from the order management server and the photo album data 200 in an associated manner. Then, the management server 120 transmits the order information including the photo album data 200 and the order-related information to the printing management server. The printing management server receives the order information transmitted from the management server 120. Then, the printing management server instructs the printer to perform printing based on the photo album data 200 and performs delivery management for the created photo album.

<Operating Album Creation Application>

A method for operating the album creation application will be described below. According to the present exemplary embodiment, when the user specifies the album creation application displayed on the display apparatus 106, for example, by tapping the icon of the album creation application, the album creation application stored in the storage device 108 is activated. More specifically, when the program of the album creation application stored in the storage device 108 is loaded into the RAM 102 and then executed by the CPU 101, the album creation application is activated.

The album creation application, an application for generating the photo album data 200, is distributed by a photo album production company. For example, the user can download this application from a web page where the photo album production company offers a photo album creation service and from an application distribution service linked from the web page.

Screens of the album creation application and transitions between the screens will be described below with reference to FIGS. 3A to 3I and FIG. 4, consisting of FIGS. 4A to 4C. FIG. 3A to 3I illustrate display screens provided by the album creation application and displayed on the display apparatus 106. FIG. 4 illustrates transitions between the display screens.

Figure 3A:
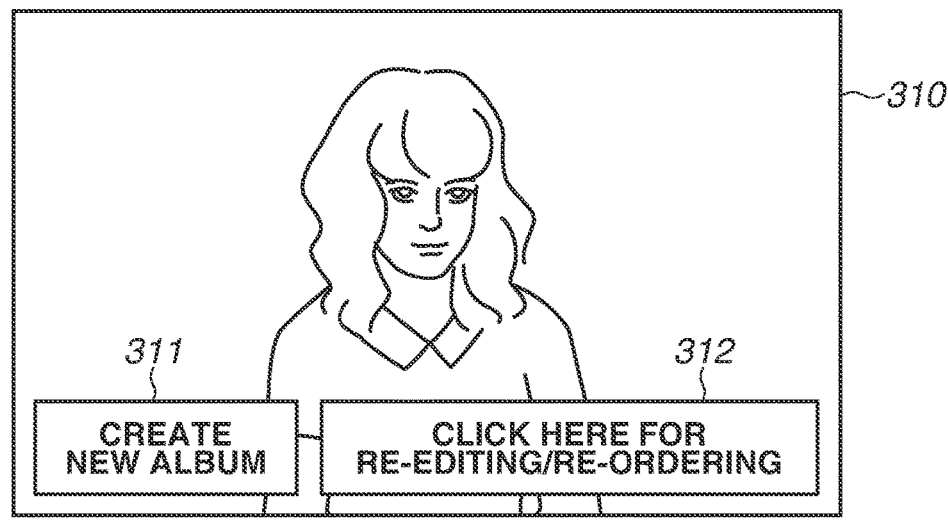
FIGS. 3A to 3I illustrate display screens provided by an album creation application.
Figure 4C:
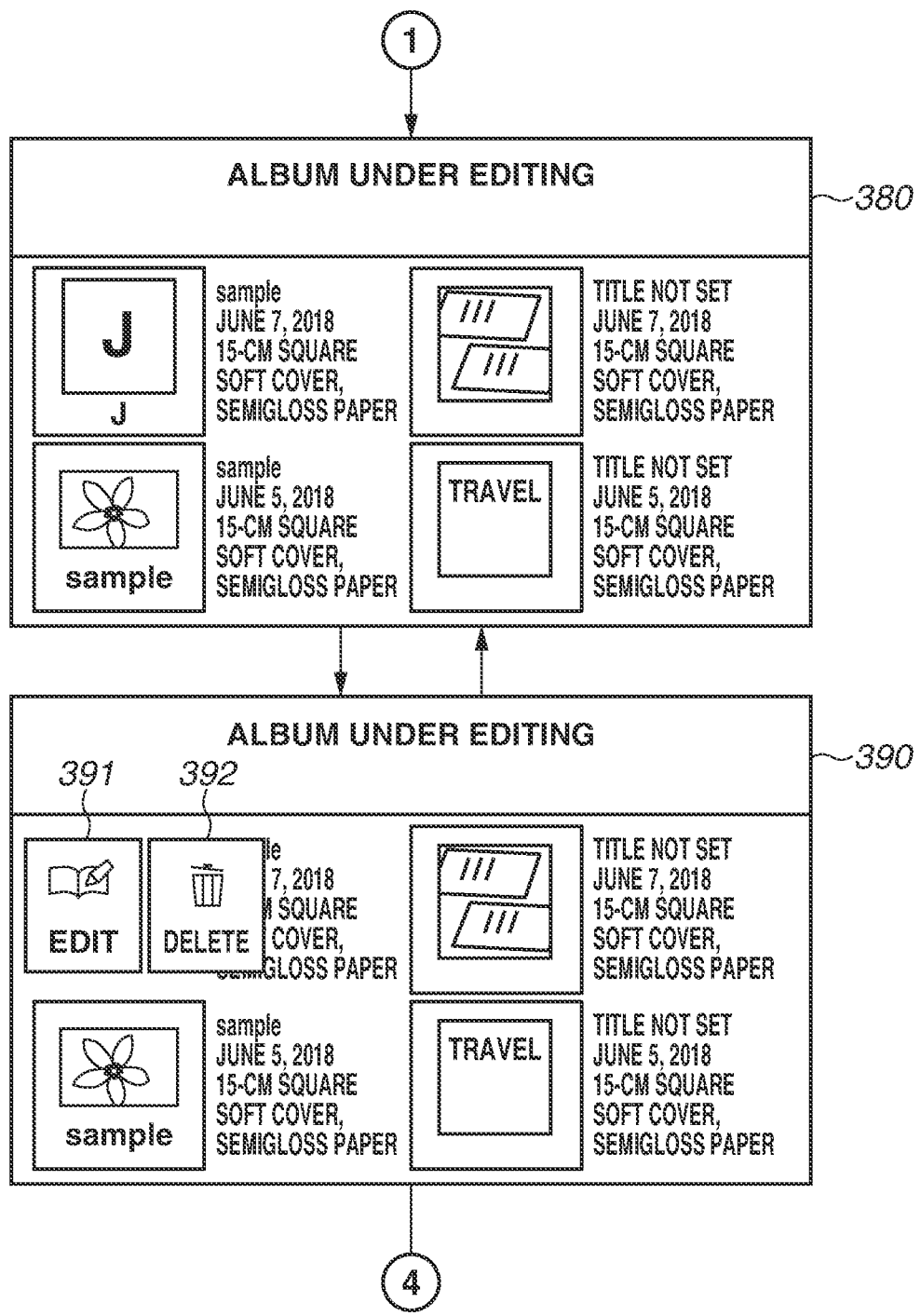
FIG. 4, consisting of FIGS. 4A to 4C, schematically illustrates a transition between the display screens provided by the album creation application.

A screen 310 illustrated in FIG. 3A is displayed when the album creation application is activated. This screen is used by the user to make a choice regarding whether to create a new album or edit an existing album. When the user presses a "CREATE NEW ALBUM" button 311, the current screen transitions to a screen 320. When the user presses "CLICK HERE FOR RE-EDITING/RE-ORDERING" button 312, the current screen transitions to a screen 380.

Figure 3B:
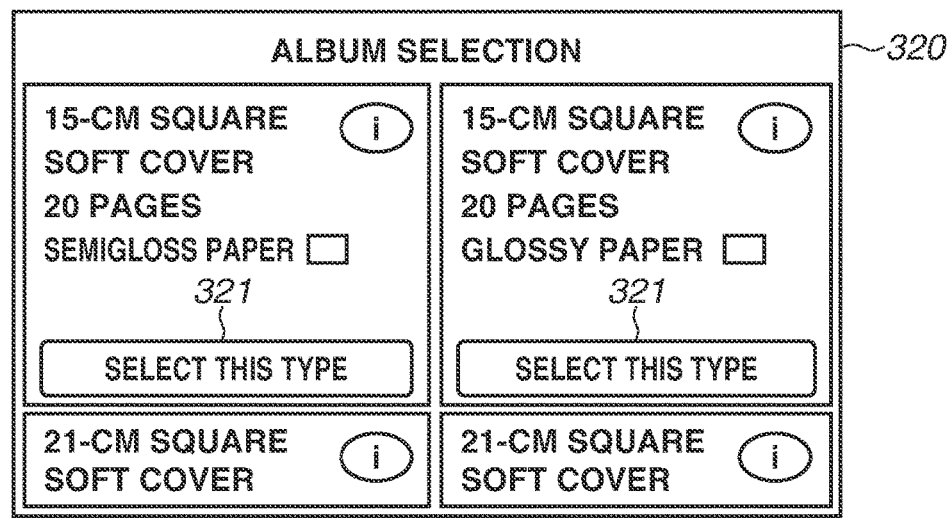

A screen 320 illustrated in FIG. 3B is used to select the album type to be created. The user can select an album type from a plurality of listed album types that are different in album size, paper type (material), and the number of pages. When the user presses a "SELECT THIS TYPE" button 321 in a desired album type from the plurality of listed album types, the processing proceeds to a screen 330.

Figure 3C:
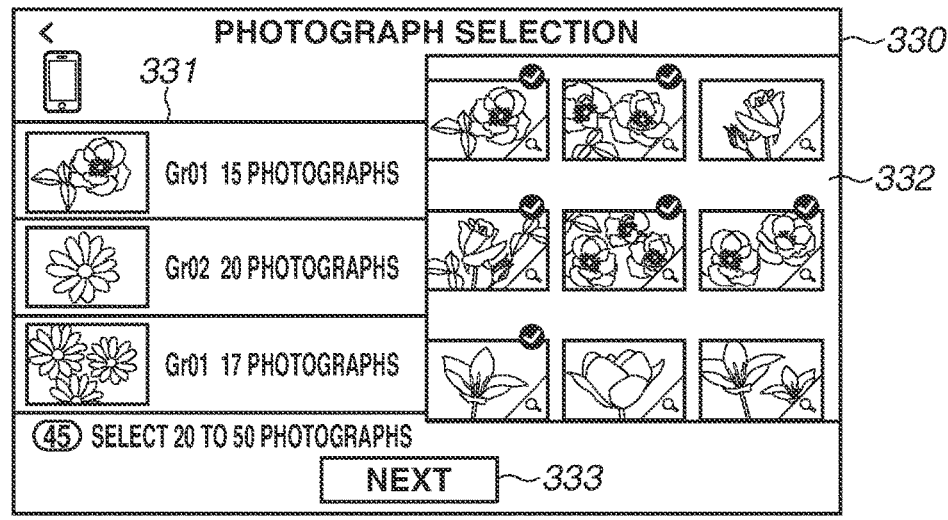

The screen 330 illustrated in FIG. 3C is used to select photographs to be used for the album from photographs stored in the storage device 108. A folder list 331 is displayed on the left-hand side of the screen 330, and an image list 332 as a list of images stored in the selected folder is displayed on the right-hand side of the screen 330. The screen 330 also includes a "NEXT" button 333 in the footer area. After selecting a predetermined number of photographs, the user presses the "NEXT" button 333. Then, the current screen transitions to a screen 340.

Figure 3D:
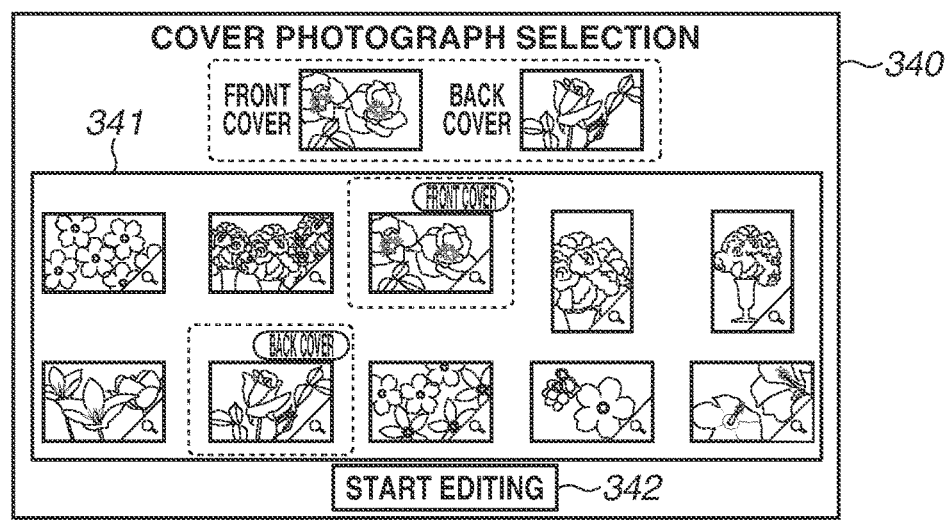

The screen 340 illustrated in FIG. 3D is a cover photograph selection screen and is used to select a front cover image and a back cover image from a selected image list 341 as a list of images selected in the screen 330. The footer area includes a "START EDITING" button 342. After selecting photographs for the front and the back covers, the user presses the "START EDITING" button 342. Then, the display of the display apparatus 106 changes to a screen 350.

Figure 3E:
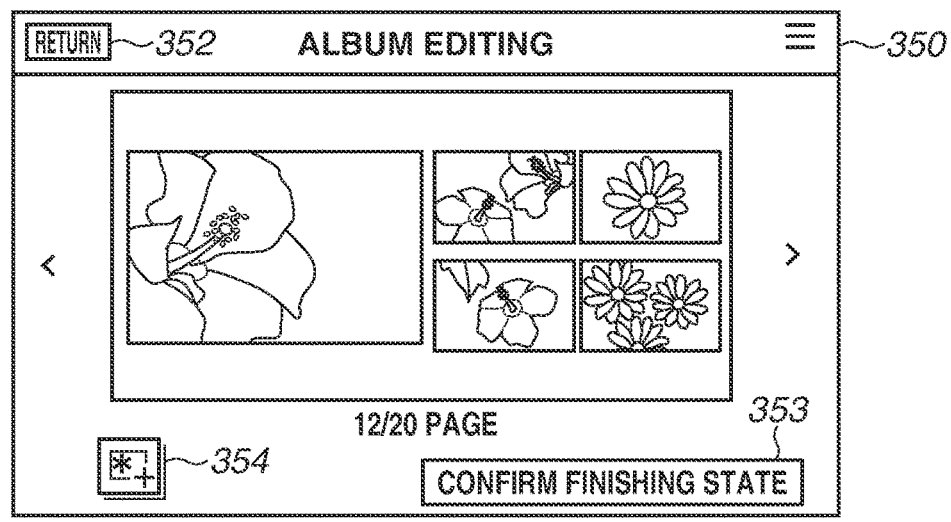

The screen 350 illustrated in FIG. 3E is an album editing screen. This screen displays an album layout 351 in two-page spread form. The user can edit the album while confirming the laid-out images. When the user presses a "RETURN" button 352, the edited content of the album is automatically stored, and the current screen returns to the screen 310. When the user presses a "CONFIRM FINISHING STATE" button 353, the current screen transitions to a screen 360.

Figure 3F:
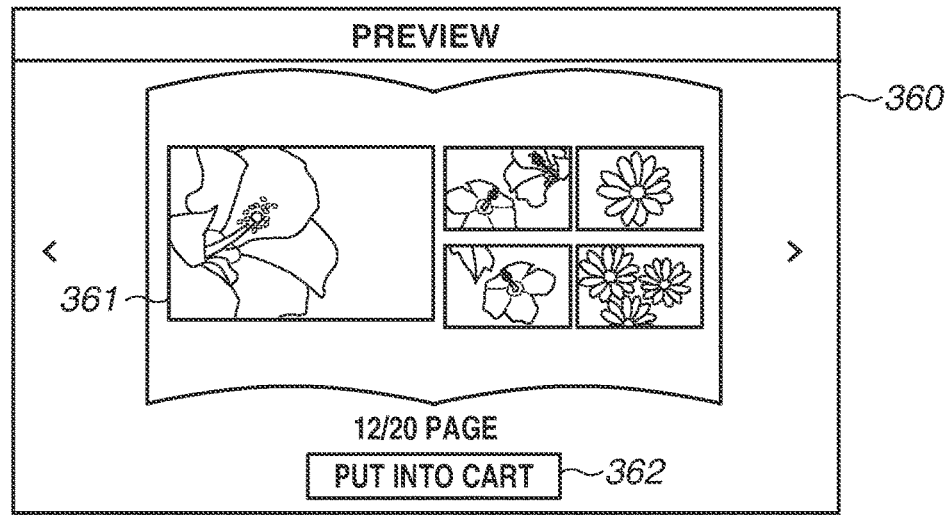
Figure 3G:
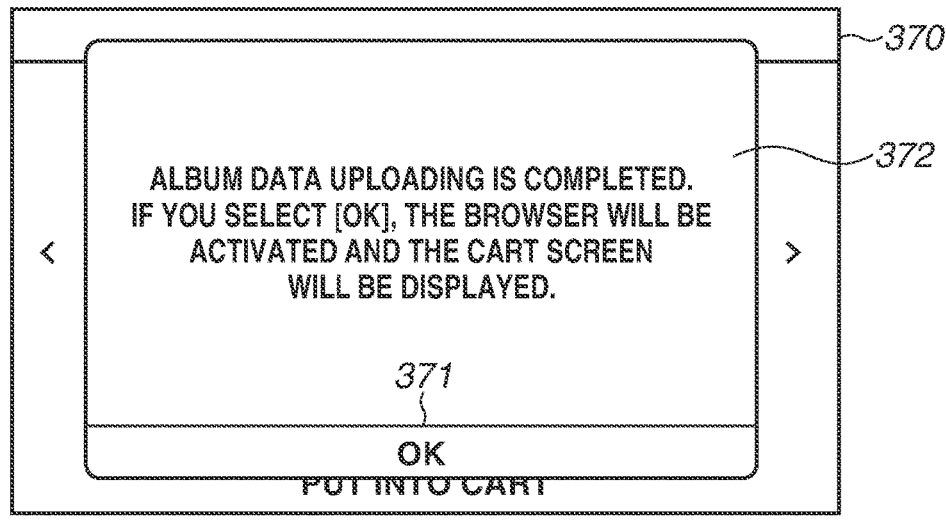

The screen 360 illustrated in FIG. 3F is a preview screen. The preview screen displays the shape of the selected album type and a finished album image 361 in which laid-out photographs are reflected. The footer area includes a "PUT INTO CART" button 362. When the user presses the "PUT INTO CART" button 362, album data to be uploaded is created based on the created album information and uploaded to a management system. Upon completion of uploading of the album data, an upload completion message 372 as illustrated in a screen 370 is displayed. When the user presses an "OK" button 371, a web browser is activated, and a cart screen (not illustrated) is displayed. Upload processing will be described in detail below with reference to FIG. 5.

Figure 3H:
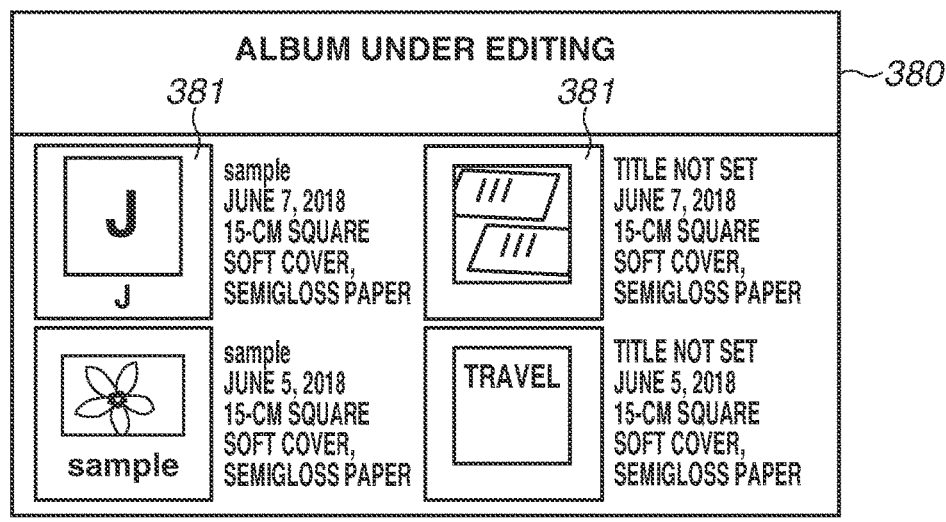
Figure 3I:
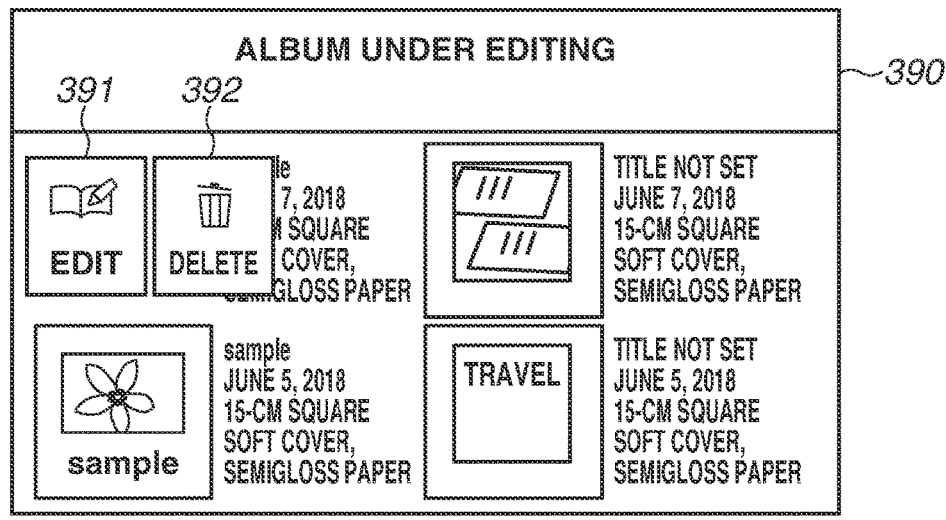

The screen 380 illustrated in FIG. 3H is an album-under-editing selection screen. The album-under-editing selection screen displays albums under editing 381. When the user selects any one of the albums, an "EDIT" button 391 and a "DELETE" button 392 are displayed in a screen 390, as illustrated in FIG. 3I. When the user presses the "EDIT" button 391, the current screen transitions to the screen 350. When the user presses the "DELETE" button 392, the album currently being selected is deleted, and the current screen returns to the screen 380. After pressing a "START EDITING" button 342 to start editing the album, if the user stops the editing operation before pressing the "PUT INTO CART" button 362 in the screen 360, the album currently being edited is stored as an album under editing in the smartphone 100. In addition, after an album is once put in the cart, if the user starts re-editing the album (copies and edits the album), the album currently being edited is also stored as an album under editing. These albums under editing are displayed as the albums under editing 381 in list form in the screen 380. An album under editing refers to data after images are laid out (i.e., data after image editing is started). Therefore, albums under editing include data on which editing is not completed (incomplete editing data) and data on which editing is completed.

The description of the basic processing flow for creating album data by using the album creation application has been provided above. As illustrated in FIG. 4, when the user specifies the "START EDITING" button 342 in the screen 340 or the "CLICK HERE FOR RE-EDITING/RE-ORDERING" button 312 in the screen 310, album update information is transmitted from the smartphone 100 to the management server 120. The album update information is also transmitted from the smartphone 100 to the management server 120 when the user specifies the "DELETE" button 392 (not illustrated in FIG. 4) in the screen 390. The album update information will be described in detail below.

<Album Upload Processing>

Figure 5:
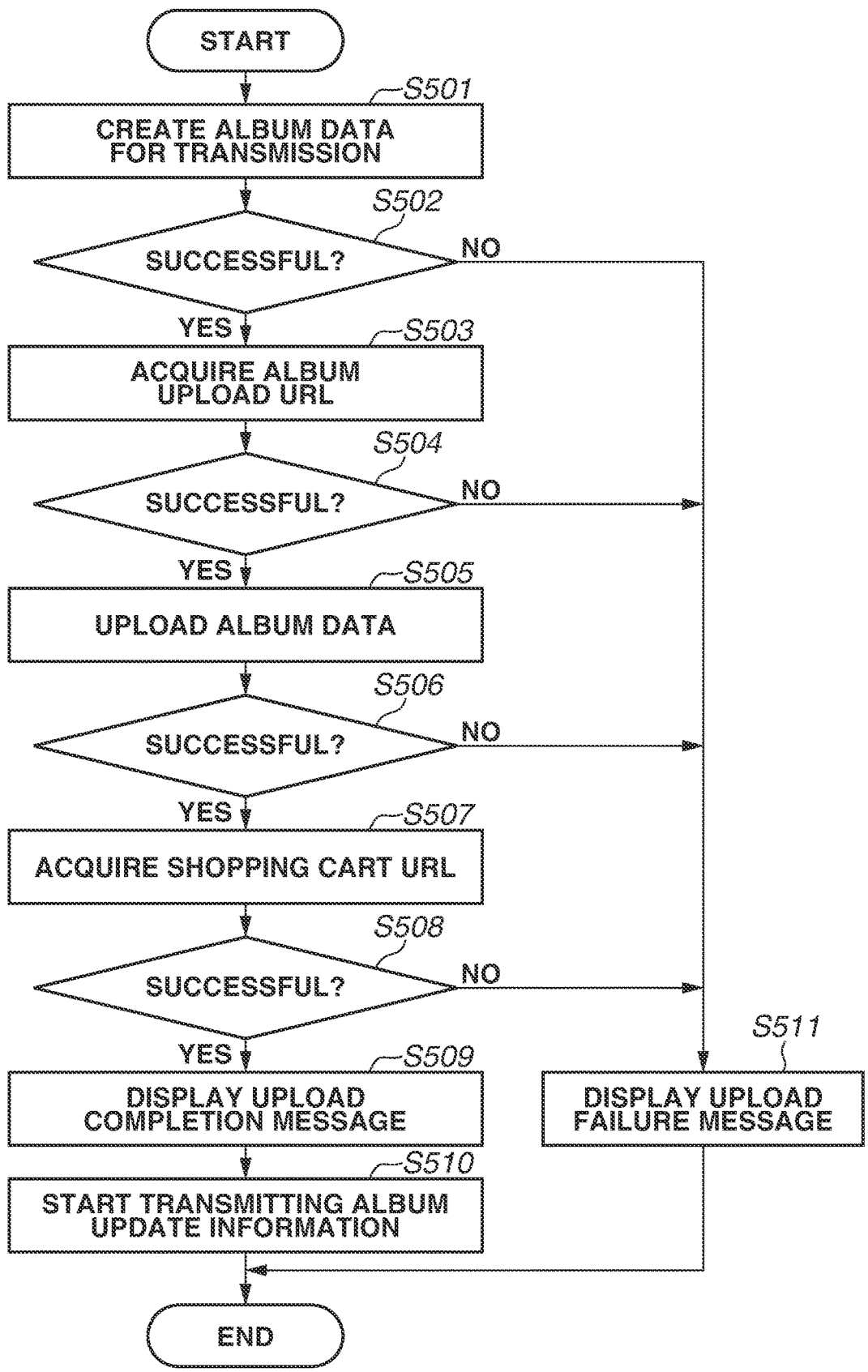
FIG. 5 is a flowchart illustrating operations of the album creation application.

Processing of the application after the activation of the "PUT INTO CART" button 362 in the preview screen 360 will be described below with reference to the flowchart illustrated in FIG. 5. FIG. 5 is a flowchart illustrating the flow of upload processing. Although the album creation application is hereinafter described as a subject of each process, each function is actually implemented when the CPU 101 executes the corresponding program of the album creation application. Not all of processing is necessarily executed in succession in one process. In some cases, control is once transferred to the OS and then processing is called again from the OS. This flowchart conveniently and intelligibly indicates main processing of the album creation application.

In S501, the album creation application creates album data to be uploaded, based on the album information created by the user.

In S502, the album creation application determines whether the processing in S501 is successful. When the processing is successful (YES in S502), the processing proceeds to S503. On the other hand, when the processing has failed (NO in S502), the album creation application interrupts the upload processing. Then, the processing proceeds to S511.

In S511, the album creation application displays, on the display apparatus 106, a message box including a message describing that the upload processing has failed.

In S503, the album creation application makes an inquiry about acquiring an album uploading target Universal Resource Locator (URL) to the management server 120. For example, the album creation application may issue a request for acquiring the album uploading target URL and acquires the album uploading target URL via the communication apparatus 104.

In S504, the album creation application determines whether the processing in S503 is successful. When the processing is successful (YES in S504), the processing proceeds to S505. On the other hand, when the processing has failed (NO in S504), the album creation application interrupts the upload processing. Then, the processing proceeds to S511.

In S505, the album creation application uploads the album data created in S501 to the URL acquired in S503. For example, the album creation application performs the upload processing via the communication apparatus 104.

In S506, the album creation application determines whether the processing in S505 is successful. When the processing is successful (YES in S506), the processing proceeds to S507. On the other hand, when the processing has failed (NO in S506), the album creation application interrupts the upload processing. Then, the processing proceeds to S511.

In S507, the album creation application makes an inquiry about the URL of the website for processing payment for the uploaded album to the management server 120 and acquires the URL. For example, the album creation application may issue a request for acquiring the URL of the website for processing payment and acquires the website URL via the communication apparatus 104.

In S508, the album creation application determines whether the processing in S507 is successful. When the processing is successful (YES in S508), the processing proceeds to S509. On the other hand, when the processing has failed (NO in S508), the album creation application interrupts the upload processing. Then, the processing proceeds to S511.

In S509, the album creation application displays, on the display apparatus 106, a message box (the screen 370 illustrated in FIG. 3G) including a message describing that the upload processing is completed. When the user presses the press the "OK" button 371 in the screen 370, the web browser is activated based on the URL for processing payment acquired in S507, and the cart screen (not illustrated) is displayed.

In S510, the album creation application starts transmitting the album update information (described below).

<Album Update Information Transmission Processing and Push Notification>

The album update information will be described below. According to the present exemplary embodiment, the album creation application transmits the album update information to the management server 120 at a timing of an operation of starting editing or re-editing of the album data ("START EDITING/RE-EDITING" operation), a timing of an operation of deleting the album data ("DELETE" operation), and a timing of an operation of putting the album data into a cart ("PUT INTO CART" operation).

The timing of starting editing/re-editing of the album data includes the timing when the "START EDITING" button 342 in the screen 340 is pressed and the timing when the "EDIT" button 391 in the screen 390 is pressed. In response to the depression of each button, the album creation application transmits the current date/time information to the management server 120 as album update information.

The timing of the "DELETE" operation includes the timing when the "DELETE" button 392 in the screen 390 is depressed. In response to the depression of the "DELETE" button 392, the album creation application transmits, to the management server 120, the update date/time information of the album having the latest update date/time among the remaining albums under editing after the deletion processing, as album update information. If there are no remaining albums under editing after the deletion processing, the album creation application transmits an empty string to the management server 120 as album update information.

The timing of the "PUT INTO CART" operation includes the timing when the screen 370 is displayed after the depression of the "PUT INTO CART" button 362 in the screen 360. When the user presses the "PUT INTO CART" button 362, uploading of the album data is completed. In response to the display of the screen 370, the album creation application transmits an empty string to the management server 120 as album update information.

When the album creation application transmits the album update information to the management server 120, the communication processing is performed as background processing which does not appear in the display processing. For example, when the album update information transmission is started in response to the depression of the "START EDITING" button 342 in the screen 340, the display of the display apparatus 106 changes to the screen 350 even if the transmission is not completed. Therefore, the user operation does not enter the wait state before the communication processing for the album update information ends.

Upon receipt of the album update information from the smartphone 100, the management server 120 records the album update information received from the smartphone 100 for each user (each terminal). In other words, when the management server 120 receives the date/time information as album update information, the management server 120 records the date/time. When an empty string is received, the management server 120 records an empty string. Since the album update information is managed for each user, it is recorded in association with the user.

The management server 120 periodically checks the recording area where the album update information is recorded and determines whether a predetermined notification condition is satisfied. In some embodiments, the management server 120 determine whether the date/time of the recorded album update information has reached a predetermined period. For example, when 10 days is set as the predetermined period, the management server 120 checks the recording area every day and determines that the date/time has reached the predetermined period if the recorded update date/time is the date/time 10 days before. Then, the management server 120 determines to issue a push notification to the corresponding user. When the management server 120 determines to issue a push notification, the management server 120 transmits a push notification request for the target user to the push notification server 130. The content of a push notification is set by the management server 120. For example, a push notification issued when the management server 120 determines that the date/time of the album update information has reached the predetermined period is used to notify the user that an album under editing exists. When the management server 120 transmits a push notification request to the push notification server 130, the management server 120 updates the update information recorded in the management server 120 from the date/time information to an empty string.

When the management server 120 checks the recording area and recognizes that the recorded update date/time is an empty string, the management server 120 neither determines whether the date/time of the album update information has reached the predetermined period nor transmits a push notification request.

Upon issuance of a push notification request by the management server 120, the push notification server 130 issues a push notification to the smartphone 100. Upon reception of the push notification, the smartphone 100 displays the content of the notification. For example, a message "ALBUM UNDER EDITING IS PRESENT" may be displayed as the push notification. The message of the push notification is displayed by the OS of the smartphone 100.

The following describes cases where various communications are disabled by a temporary communication failure. FIG. 6 is a table illustrating the degree of effect when communication is not performed, for each communication processing type. The degree of effect is determined in view of the degree of effect on the user's confusion which arises if each communication processing type is disabled. However, the degree of effect is examined and determined by the developer of the album creation application and may be changed depending on conditions.

Referring to FIG. 6, if album uploading target URL acquisition (No. 1), album data uploading (No. 2), or shopping cart URL acquisition (No. 3) has failed, an error message is displayed, as described above with reference to FIG. 5. More specifically, the communication processing types illustrated in No. 1 to No. 3 of FIG. 6 is main processing for ordering an album. Therefore, if any one of these pieces of processing is disabled because of a temporary communication failure, the user needs to be immediately notified of the trouble. Therefore, the smartphone 100 displays an error message to enable the user to know that communication has failed. For example, the user may need to perform an operation for improving the communication environment for the fact that the album data upload processing itself is not completed. However, since the user correctly grasps the fact, the degree of effect is low from the viewpoint of user's confusion. Therefore, the degree of effect is set to "LOW".

Referring to FIG. 6, album update information transmission (No. 4) is transmission processing performed in the background. Therefore, no error message is displayed even if the transmission has failed. Therefore, an unsuitable push notification may be transmitted depending on the situation, thereby possibly confusing the user. The following describes an example case where the "DELETE" button 392 in the screen 390 is pressed and album data under editing no longer exists. In this case, if an empty string is not transmitted to the management server 120 as album update information after the depression of the "DELETE" button 392, the date/time information transmitted last remains recorded in the management server 120 as album update information. Therefore, although there are no albums under editing, a push notification, "ALBUM UNDER EDITING IS PRESENT", may be transmitted from the management server 120 when a predetermined period has elapsed. In such a case, the user gets confused because the user does not know the reason why such a notification is delivered. Therefore, for album update information transmission (No. 4), the degree of effect is set to "HIGH".

<Communications Processing Flow>

Communication processing will be described below with reference to FIGS. 7 and 8. In the communication processing according to the present exemplary embodiment, the communication parameters are changed according to the degree of effect for each piece of communication processing based on the table illustrated in FIG. 6. FIGS. 7A and 7B are flowcharts illustrating the communication processing. Although the album creation application is hereinafter described as a subject of each piece of processing, each function is actually implemented when the CPU 101 executes a corresponding program of the album creation application. Not all of the processing is necessarily executed in succession in one process. In certain cases, control is once transferred to the OS and then processing is called again from the OS. This flowchart conveniently and intelligibly indicates main processing of the album creation application.

Figure 7A:
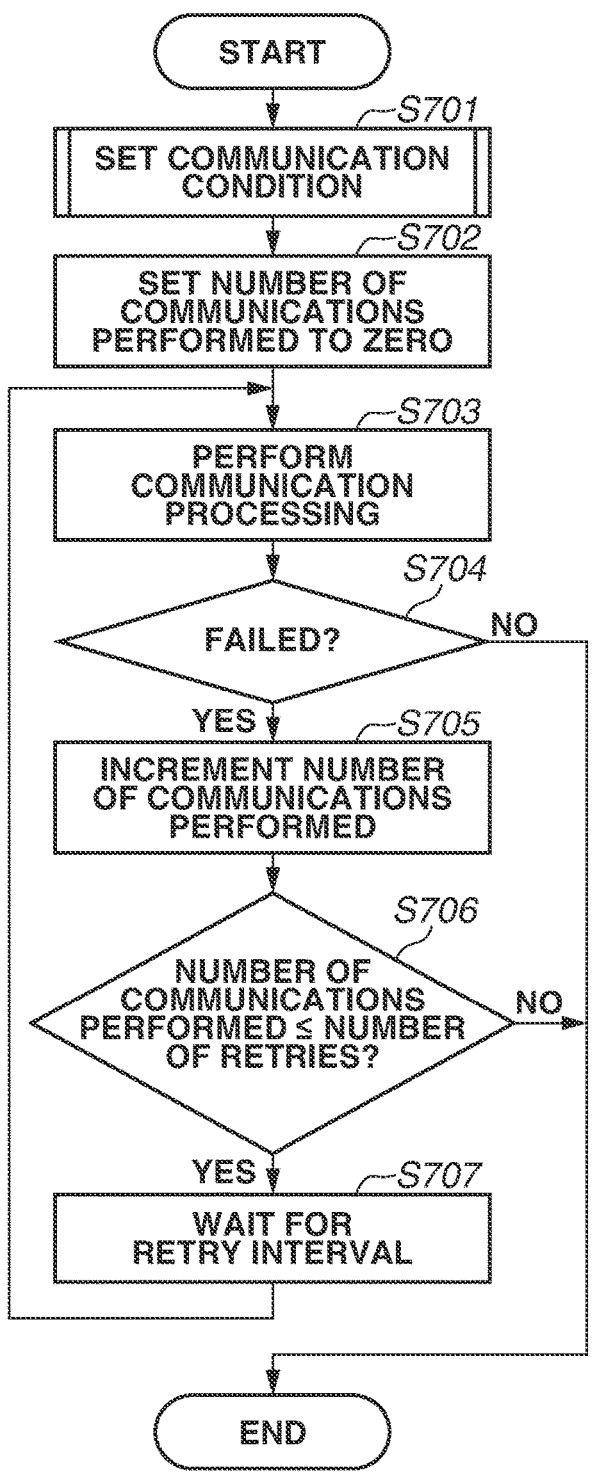
FIGS. 7A and 7B are flowcharts illustrating communication processing and communication parameter setting.
Figure 7B:
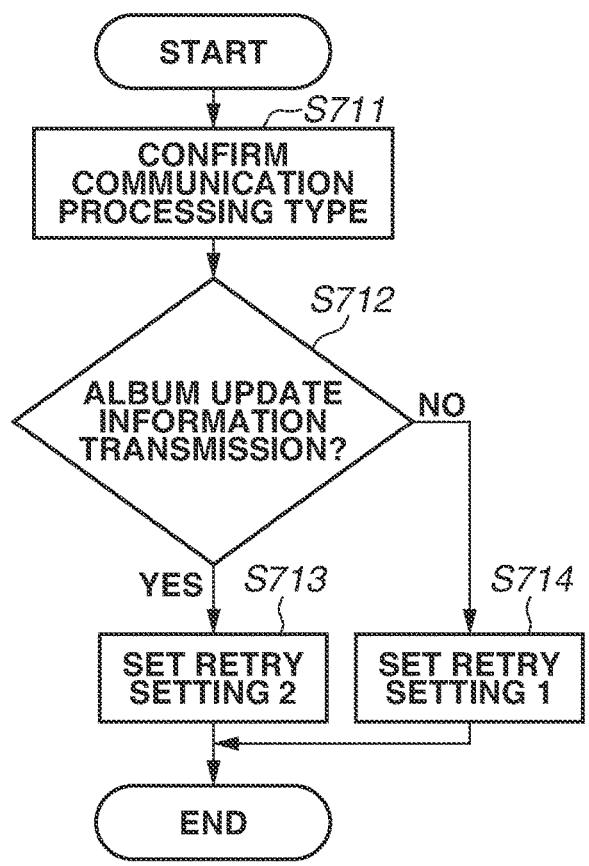

Referring to FIG. 7A, in S701, the album creation application sets the communication condition for the communication processing to be executed (target communication processing). FIG. 7B is a flowchart illustrating detailed processing for setting the communication condition. In S711, the album creation application confirms the type of the target communication processing. The communication processing type in this case refers to any one of the communication processing types illustrated in No. 1 to No. 4 of FIG. 6.

In S712, the album creation application determines whether the communication processing type is album update information transmission. When the communication processing type is album update information transmission (YES in S712), the processing proceeds to S713. On the other hand, when the communication processing type is not album update information transmission (NO in S712), the processing proceeds to S714.

In S713, the album creation application sets a communication setting 2 illustrated in FIG. 8 as the communication condition. On the other hand, in S714, the album creation application sets a communication setting 1 illustrated in FIG. 8 as the communication condition. For example, when the target communication processing is any one of the communication processing types illustrated in No. 1 to No. 3 of FIG. 6, the album creation application sets the communication setting 1. When the target communication processing is the communication processing type illustrated in No. 4 of FIG. 6, the album creation application sets the communication setting 2. When the communication condition setting is completed, the processing proceeds to S702 illustrated in FIG. 7A.

In S702, the album creation application sets the value of the parameter indicating the number of communications recorded in the RAM 102 to zero. In S703, the album creation application performs the target communication processing. The communication processing performed by the album creation application indicates communication performed via the communication apparatus 104 of the smartphone 100.

In S704, the album creation application determines whether the communication processing performed in S703 has failed. When the communication processing is successful (NO in S704), the processing illustrated in FIG. 7A is ended. On the other hand, when the communication processing has failed (YES in S704), the processing proceeds to S705.

In S705, the album creation application adds 1 to the value of the parameter for recording the number of communications performed and records the resultant value in the RAM 102.

In S706, the album creation application compares the number of communications performed recorded in S705 with the number of communication retries in the communication setting set in S701. When the number of communications performed is equal to or less than the number of communication retries (YES in S706), the processing proceeds to S707. On the other hand, when the number of communications performed is larger than the number of communication retries (NO in S706), the processing illustrated in FIG. 7A is ended. For example, in some embodiments, when the target communication processing is any one of the respective communication processing types illustrated in No. 1 to No. 3 of FIG. 6, the album creation application determines whether the number of communications performed is equal to or less than the number of retries (3 times) in the communication setting 1. When the number of communications performed exceeds 3 (NO in S706), the processing is ended. On the other hand, when the number of communications performed is equal to or less than 3 (YES in S706), the processing proceeds to S707. Also for example, when the target communication processing is the communication processing type illustrated in No. 4 of FIG. 6, the album creation application determines whether the number of communications performed is equal to or less than the number of retries (20 times) in the communication setting 2. When the number of communications performed exceeds 20 (NO in S706), the processing is ended. On the other hand, when the number of communications performed is equal to or less than 20 (YES in S706), the processing proceeds to S707.

In S707, the album creation application waits for the retry interval in the communication setting set in S701. When the time period for the set retry interval has elapsed, the processing returns to S703. In S703, the album creation application retries the communication processing again. For example, when the target communication processing is any one of the respective communication processing types illustrated in No. 1 to No. 3 of FIG. 6, the album creation application waits for the retry interval (0.5 seconds) in the communication setting 1. When the target communication processing is the communication processing type illustrated in No. 4 of FIG. 6, the album creation application waits for the retry interval (3 seconds) in the communication setting 2. In S703, the album creation application performs the communication processing again. Then, the processing proceeds to S704 and subsequent operations.

In view of the degree of effect on the user in this way, changing the communication condition for the target communication processing enables performing the communication retry processing according to the target communication processing. This makes it possible to prevent the resources of the terminal from being consumed by the retry processing itself and the accompanying battery consumption.

Although, in the above-described example, only the number of communication retries and the retry interval are set as the communication parameters to be changed according to the degree of effect, the configuration is not limited thereto. For example, the time-out period and the packet size may also be used as the communication parameters. The communication parameters may include a specification of the communication protocol indicating either User Datagram Protocol (UDP) or Transmission Control Protocol (TCP). The communication parameters may also include a specification of the communication protocol indicating either http or https.

The display screens of the album creation application and the transitions between the screens according to the present exemplary embodiment are not limited to the examples illustrated in FIGS. 3A to 3I and 4. For example, in response to the depression of the "PUT INTO CART" button 362 in the screen 360, the album creation application may transmit the album update information as the "PUT INTO CART" operation associated with the push notification. The album creation application may subsequently display the cart screen (not illustrated) on the smartphone 100. In this case, after the depression of a "PURCHASE" button provided in the cart screen, the album creation application may perform processing for uploading the actual album data and proceed to the payment screen.

A second exemplary embodiment will be descried below. The present exemplary embodiment differs from the first exemplary embodiment in that, for the album update information transmission related to a push notification, the communication condition is changed according to the user operation type at the time of album update information transmission. The system and the hardware configurations according to the present exemplary embodiment are similar to those according to the first exemplary embodiment, so that redundant descriptions thereof will be omitted. In each flowchart, for portions similar to those according to the first exemplary embodiment, redundant descriptions thereof will be omitted. Portions different from those according to the first exemplary embodiment, such as the communication parameter setting, will be mainly described below.

FIGS. 9A and 9B are tables illustrating the album update information transmission, more specifically, a relation between each user operation at the time of album update information transmission and the degree of effect on the user if the album update information transmission failed.

According to the present exemplary embodiment, for cases in which the phenomenon that has occurred remains unchanged regardless of the success or failure of the communication, the degree of effect is set to "NONE". In a case in which no message is simply notified to the user if communication has failed, the degree of effect is set to "LOW". In a case in which, if communication has failed, a message (not a wrong message for the user) is transmitted to the user at a timing not expected by the distributor, the degree of effect is set to "MIDDLE". In a case in which a wrong message is notified to the user if communication failed, the degree of effect is set to "HIGH". The table illustrated in FIG. 9A will be described in detail below.

Referring to FIG. 9A, No. 1 and No. 2 indicate the degree of effect if the album update information transmission to be performed in response to the "START EDITING/RE-EDITING" user operation is not performed. The timing of the "START EDITING/RE-EDITING" operation includes the timing of pressing the "START EDITING" button 342 in the screen 340 and the timing of pressing the "EDIT" button 391 in the screen 390. In response to the depression of each button, the album creation application transmits the current date/time information to the management server 120 as album update information. The difference between No. 1 and No. 2 of FIG. 9 is whether date/time information has already been recorded in the management server 120 as album update information.

In a case of No. 1 of FIG. 9, the album update information accompanying the "START EDITING/RE-EDITING" operation is not transmitted, and the date/time information is not recorded in the recording area of the management server 120 as album update information. In such a case, even in a case where the user starts creating album data and interrupts the operation, the date/time information is not present in the recording area of the management server 120 as album update information. Therefore, in this state, a push notification request is not issued from the management server 120 even after a set predetermined period has elapsed.

In a case of No. 2 of FIG. 9, the album update information accompanying the "START EDITING/RE-EDITING" operation is not transmitted, and the date/time information accompanying the user operation performed in the past, for example, is recorded in the recording area of the management server 120 as album update information. In such a case, in a case where the user starts creating album data and interrupts the operation, the past date/time information remains recorded in the recording area of the management server 120 as album update information, even if the album update information accompanying the current operation is not transmitted. More specifically, old date/time information remains recorded. Therefore, in this state, a push notification request is issued from the management server 120 before the set predetermined period has elapsed.

In either case of No. 1 and No. 2 of FIG. 9, the management server 120 performs determination differently from the actual situation. No. 2 has a larger effect on the user than No. 1 in terms of user's confusion. More specifically, in a case of No. 1, a push notification is not simply delivered to the user, which does not cause confusion for the user. In a case of No. 2, however, a notification may possibly be delivered to the user at a timing immediately after editing. Since the user may feel the notification to be troublesome, the degree of effect is set to "MIDDLE", which is higher than that of No. 1.

Referring to FIG. 9A, No. 3 to No. 6 each indicate the degree of effect if the album update information transmission to be performed in response to the user's "DELETE" operation is not performed. The timing of the operating of deleting selected album data includes the timing of pressing the "DELETE" button 392 in the screen 390. In response to the depression of the "DELETE" button 392, the album creation application transmits, to the management server 12, the update date/time information of the album having the latest update date/time among the remaining albums under editing after the deletion processing as album update information. If there are no remaining albums under editing after the deletion processing, the album creation application transmits an empty string to the management server 120 as album update information.

No. 3 of FIG. 9 indicates a case where the past date/time information is not recorded in the management server 120 as album update information. In this case, since a push notification is not transmitted regardless of the success or failure of the album update information transmission accompanying the current operation, the degree of effect is set to "NONE".

No. 4 of FIG. 9 indicates a case where no album under editing remains after the deletion processing, and the past date/time information is recorded in the management server 120 as album update information. In this case, in spite of the absence of album under editing (there are no albums to be displayed in the screen 380), a push notification "ALBUM UNDER EDITING IS PRESENT" is delivered to the user when the predetermined period has elapsed based on the past date/time information recorded in the management server 120. Since the user is highly likely to get confused by the push notification, the degree of effect is set to "HIGH".

No. 5 and No. 6 of FIG. 9 indicate cases where one or more albums under editing remain after the deletion processing, and the past date/time information is recorded in the management server 120 as album update information. However, No. 5 indicates a case where an album other than the album under editing having the latest update date/time is deleted by a user operation, and No. 6 indicates a case where the album under editing having the latest update date/time is deleted by a user operation. As described above, the management server 120 manages the album update information not for each album but for each user (for each smartphone 100). Therefore, the management server 120 records the latest album update information delivered from the smartphone 100 without making a distinction on an album basis. Therefore, in a case of No. 5, since a push notification is performed regardless of the success or failure of the album update information transmission accompanying the current operation, the degree of effect is set to "NONE". In a case of No. 6, on the other hand, since a push notification request may be issued from the management server 120 before the set predetermined period has elapsed, the degree of effect is set to "MIDDLE".

Referring to FIG. 9A, No. 7 to No. 9 each indicate the degree of effect if the album update information transmission to be performed in response to the user's "PUT INTO CART" operation is not performed. The timing of the "PUT INTO CART" operation includes the timing when the screen 370 is displayed after the depression of the "PUT INTO CART" button 362 in the screen 360. When the user presses the "PUT INTO CART" button 362, uploading of the album data is completed. In response to the display of the screen 370, the album creation application transmits an empty string to the management server 120 as album update information.

No. 7 indicates a case where the past date/time information is not recorded in the management server 120 as album update information. In this case, since a push notification is performed regardless of the success or failure of the album update information transmission accompanying the current operation, the degree of effect is set to "NONE".

No. 8 indicates a case where one or more albums under editing remain after the "PUT INTO CART" processing, and the past date/time information is recorded in the management server 120 as album update information. In this case, since a push notification request may be issued from the management server 120 before the set predetermined period has elapsed, the degree of effect is set to "MIDDLE".

No. 9 indicates a case where no album under editing remains after the "PUT INTO CART" processing, and the past date/time information is recorded in the management server 120 as album update information. In this case, in spite of the absence of an album under editing (there are no albums to be displayed in the screen 380), a push notification "ALBUM UNDER EDITING IS PRESENT" is delivered to the user when the predetermined period has elapsed based on the past date/time information recorded in the management server 120. Since the user is highly likely to get confused, the degree of effect is set to "HIGH".

Referring to FIG. 9A, in view of the above, even if the update information transmission has failed in the case of the "START EDITING/RE-EDITING" operation, the degree of effect is set to "MIDDLE" at the maximum. On the other hand, in the case of the "DELETE" and the "PUT INTO CART" operations, the degree of effect is set to "HIGH" at the maximum. Therefore, according to the present exemplary embodiment, the degree of effect is set to "MIDDLE" for the "START EDITING/RE-EDITING" operation, and the degree of effect is set to "HIGH" for the "DELETE" and the "PUT INTO CART" operations, as illustrated in FIG. 9B. In other words, according to the present exemplary embodiment, the album creation application determines the degree of effect according to the user operation at the time of update information transmission to reduce unsuitable push notifications.

<Communication Processing Flow>

The communication processing according to the present exemplary embodiment will be described below. The basic communication flow is similar to that according to the first exemplary embodiment illustrated in FIG. 7A. However, the processing for setting the communication condition in S701 illustrated in FIG. 7A is performed based on the flowchart illustrated in FIG. 10. For processing other than the subflowchart for S701, this flowchart performs the same operations as the flowchart according to the first exemplary embodiment, and redundant descriptions thereof will be omitted.

Figure 10:
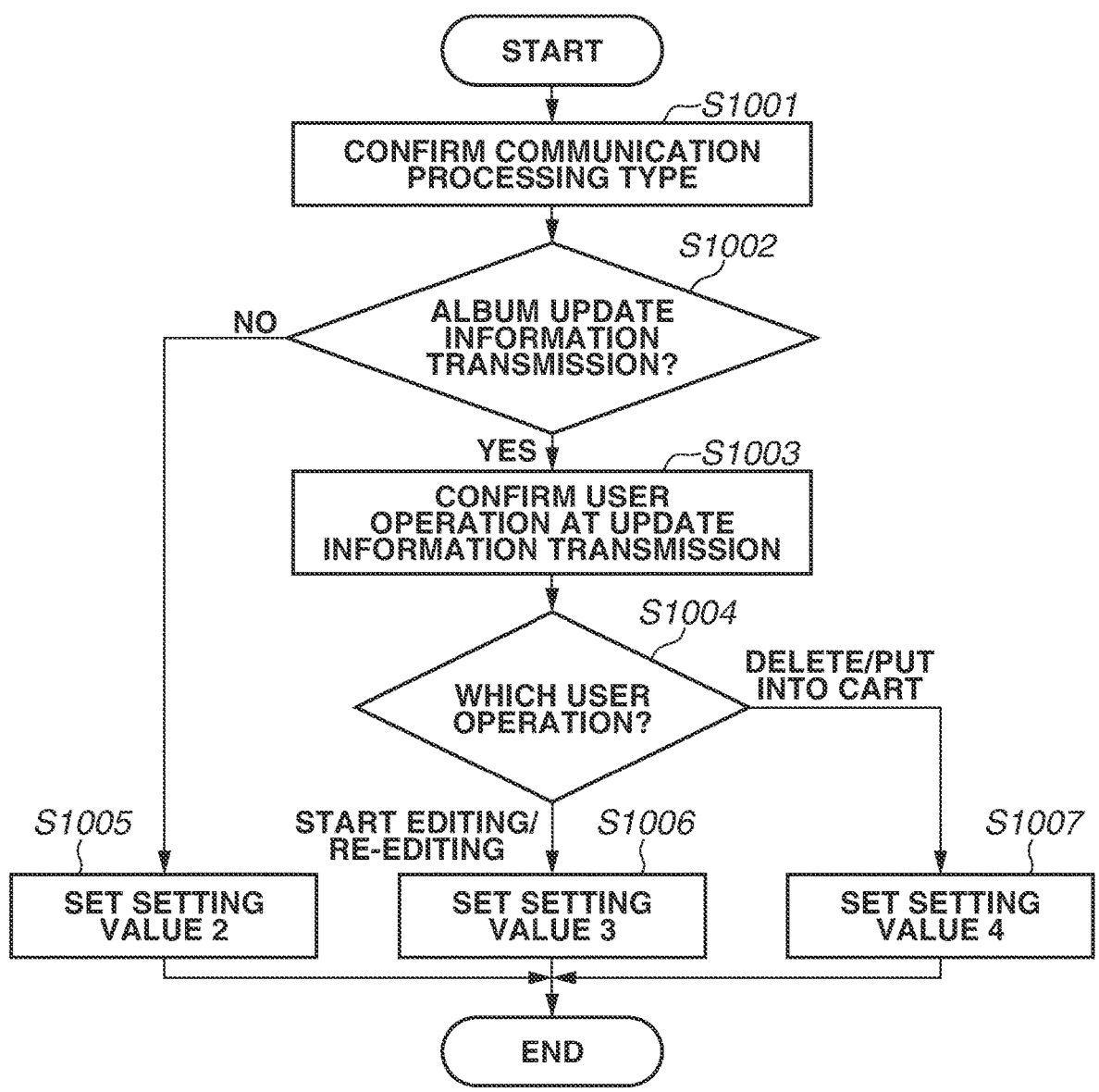
FIG. 10 is a flowchart illustrating the communication parameter setting.

Referring to FIG. 10, in S1001, the album creation application confirms the communication processing type. This processing is similar to the processing in S711 illustrated in FIG. 7B according to the first exemplary embodiment. In S1002, the album creation application determines whether the communication processing type is album update information transmission. When the communication processing type is album update information transmission (YES in S1002), the processing proceeds to S1003. On the other hand, when the communication processing type is not album update information transmission (NO in S1002), the processing proceeds to S1005.

In S1003, the album creation application confirms the user operation at the time of album update information transmission. According to the present exemplary embodiment, the user operation at the time of album update information transmission is an operation described in "USER OPERATION AT UPDATE INFORMATION TRANSMISSION" illustrated in FIG. 9B, i.e., "START EDITING/RE-EDITING", "DELETE", or "PUT INTO CART".

In S1004, the album creation application performs determination processing based on the user operation confirmed in S1003. When the user operation is "START EDITING/RE-EDITING", the processing proceeds to S1006. When the user operation is "DELETE" or "PUT INTO CART", the processing proceeds to S1007.

In S1005, the album creation application sets the communication setting 2 illustrated in FIG. 11 as the communication condition. In S1006, the album creation application sets the communication setting 3 illustrated in FIG. 11 as the communication condition. In S1007, the album creation application sets the communication setting 4 illustrated in FIG. 11 as the communication condition. For example, referring to FIG. 9B, for the user operation of "START EDITING/RE-EDITING" of which the degree of effect is set to "MIDDLE", the number of retries is set to 20, and the retry interval is set to 3 seconds. Referring to FIG. 9B, for the user operations of "DELETE" and the "PUT INTO CART" of which the degree of effect is set to "HIGH", the number of retries is set to 30, and the retry interval is set to 3 seconds.

The subsequent processing is similar to that according to the first exemplary embodiment, i.e., the album creation application performs the communication retry processing according to the set communication condition. Also, according to the present exemplary embodiment, in view of the degree of effect on the user in this way, changing the communication condition for the target communication processing enables performing the communication retry processing according to the target communication processing. This makes it possible to prevent the resources of the terminal from being consumed by the retry processing itself and the accompanying battery consumption.

According to the present exemplary embodiment, the degree of effect is changed according to the user operation type at the time of album update information transmission related to a push notification. This makes it possible to reduce the difference between the user's operation status and the push notification operation.

A third exemplary embodiment will be described below. The present exemplary embodiment differs from the second exemplary embodiment in that, in the setting of the communication condition for the album update information transmission related to the push notification, the number of albums under editing after the user operation and the date/time of the album operated are added as determination criteria. Other elements are similar to those according to the second exemplary embodiment, and redundant descriptions thereof will be omitted.

According to the present exemplary embodiment, referring to the table illustrated in FIG. 9A, the album creation application determines the degree of effect based on "USER OPERATION AT UPDATE INFORMATION TRANSMISSION", "NUMBER OF ALBUMS UNDER EDITING AFTER USER OPERATION", and "DATA/TIME OF ALBUM OPERATED". For example, according to the second exemplary embodiment, the communication condition is determined in consideration of the degrees of effect for three different cases illustrated in FIG. 9B. According to the present exemplary embodiment, the table illustrated in FIG. 9A is divided into six different cases, and the communication condition is determined in detail in consideration of each degree of effect. For example, according to the present exemplary embodiment, referring to the table illustrated in FIG. 9A, the degree of effect is considered by dividing the "DELETE" operation into three different cases (No. 4 to No. 6) and dividing the "PUT INTO CART" operation into two different cases (No. 8 and No. 9). The cases and the degrees of effect illustrated in FIG. 9A are similar to those according to the second exemplary embodiment, and redundant descriptions thereof will be omitted.

<Communications Processing Flow>

The communication processing according to the present exemplary embodiment will be described below. Although the basic processing flow is similar to that illustrated in FIG. 7A according to the first exemplary embodiment, the processing for setting the communication condition in S701 illustrated in FIG. 7A is performed based on the flowchart illustrated in FIG. 12. For processing other than the sub-flowchart for S701, this flowchart performs the same operations as the flowcharts according to the first and the second exemplary embodiments, and redundant descriptions thereof will be omitted.

Figure 12:
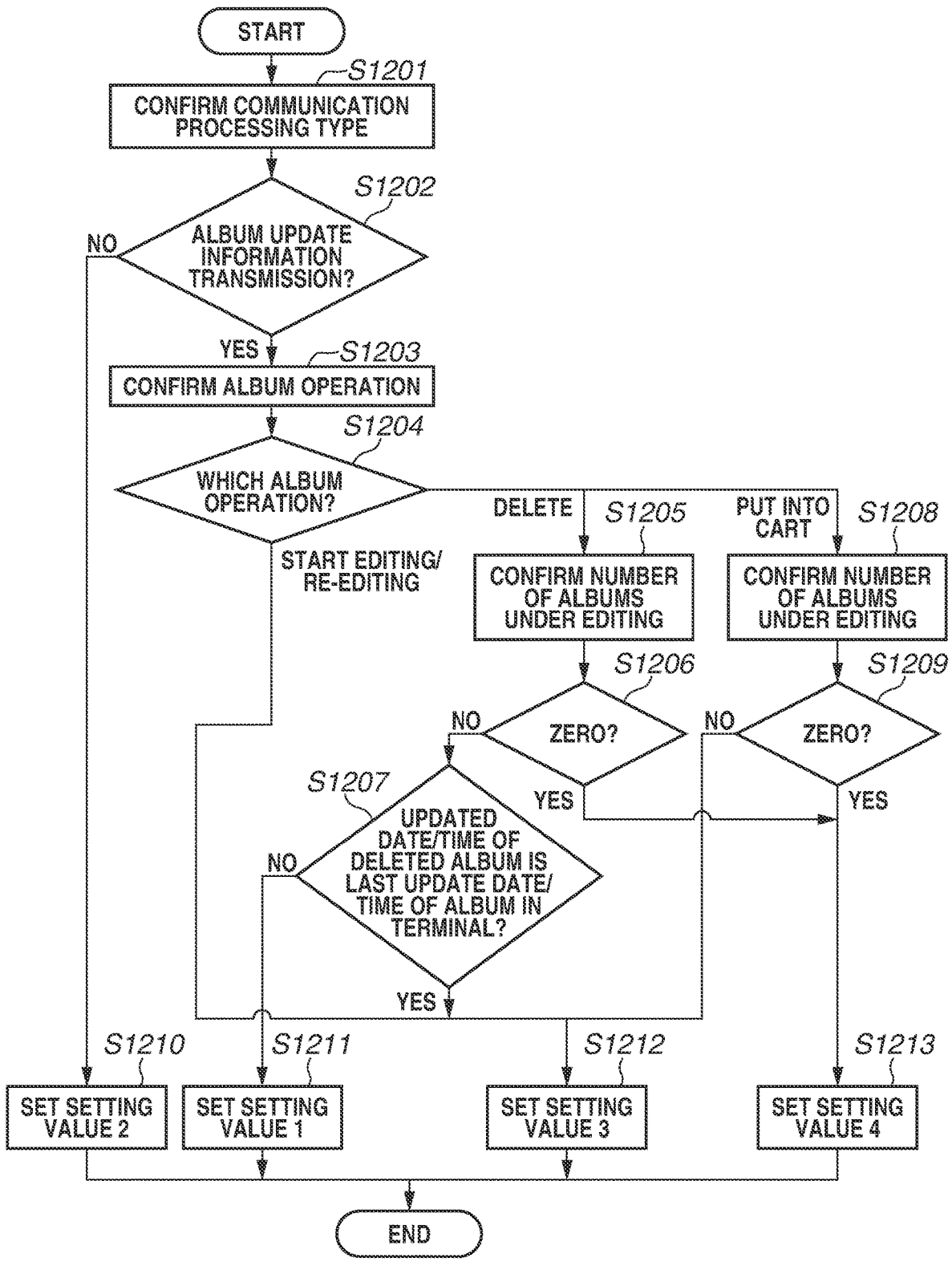
FIG. 12 is a flowchart illustrating the communication parameter setting.

Referring to FIG. 12, in S1201, the album creation application confirms the communication processing type. This processing is similar to the processing in S701 illustrated in FIG. 7B and the processing in S1001 illustrated in FIG. 10 according to the first and the second exemplary embodiments. In S1202, the album creation application determines whether the communication processing type is album update information transmission. When the communication processing type is album update information transmission (YES in S1202), the processing proceeds to S1203. On the other hand, when the communication processing type is not album update information transmission (NO in S1202), the processing proceeds to S1210.

In S1203, the album creation application confirms the user operation at the time of update information transmission. This processing is similar to the processing in S1003 illustrated in FIG. 10 according to the second exemplary embodiment.

In S1204, the album creation application performs determination processing based on the user operation confirmed in S1203. When the user operation is "START EDITING/RE-EDITING", the processing proceeds to S1212. When the user operation is "DELETE", the processing proceeds to S1205. When the user operation is "PUT INTO CART", the processing proceeds to S1208.

In S1205, the album creation application confirms the number of albums under editing. An album under editing refers to data which is created by using the album creation application in the smartphone 100 of the user and has not yet been put into the cart. For example, assume a case where the user starts editing album data by pressing the "START EDITING" button 342 in the screen 340 illustrated in FIGS. 3A to 3I and 4 and then stops the editing operation before pressing the "PUT INTO CART" button 362 in the screen 360. Album data in this state is stored as an album under editing in the smartphone 100. In addition, after an album is once put in the cart, if the user starts re-editing the album (copies and edits the album), the album is also stored as an album under editing. These albums under editing are displayed in list form in the screen 380.

In S1206, the album creation application performed determination processing based on the number of albums under editing confirmed in S1205. When the number of albums under editing is zero (YES in S1206), the processing proceeds to S1213. On the other hand, when the number of albums under editing is one or more (NO in S1206), the processing proceeds to S1207. More specifically, when no album under editing remains after performing the DELETE operation (case No. 4 illustrated in FIG. 9A), the processing proceeds to S1213. On the other hand, when at least one album under editing remains after performing the DELETE operation (case Nos. 5 and 6 illustrated in FIG. 9A), the processing proceeds to S1207.

In S1207, the album creation application compares the update date/time of the album on which the DELETE operation is performed with the update date/times of other albums under editing stored in the smartphone 100. The update date/time of an album on which the DELETE operation is performed indicates, in a case where the DELETE operation is performed on an album A, the date/time when an editing operation has been previously performed on the album A. When the album under editing having the latest update date/time is deleted with the DELETE operation (YES in S1207), the processing proceeds to S1212. On the other hand, when an album under editing not having the latest update date/time is deleted with the DELETE operation (NO in S1207), the processing proceeds to S1211. More specifically, the processing proceeds to S1211 in the case of No. 5 illustrated in FIG. 9A, and the processing proceeds to S1212 in the case of No. 6 illustrated in FIG. 9A.

According to the present exemplary embodiment, when the DELETE operation is performed, the album creation application stores, in the RAM 102, the update date/time of the album on which the DELETE operation is performed. The update date/time remains stored in the RAM 102 until the processing in S1207 is completed.

In S1208, the album creation application confirms the number of albums under editing like S1205. In S1209, the album creation application performs determination processing based on the number of albums under editing confirmed in S1208. When the number of albums under editing is zero (YES in S1209), the processing proceeds to S1213. On the other hand, when the number of albums under editing is one or more (NO in S1209), the processing proceeds to S1212. More specifically, when no album under editing remains after performing the "PUT INTO CART" operation (case No. 9 illustrated in FIG. 9A), the processing proceeds to S1213. On the other hand, when at least one album under editing remains after performing the "PUT INTO CART" operation (case No. 8 illustrated in FIG. 9A), the processing proceeds to S1212.

In S1211, the album creation application sets the communication setting 1 illustrated in FIG. 11 as the communication condition. In S1210, the album creation application sets the communication setting 2 illustrated in FIG. 11 as the communication condition. In S1212, the album creation application sets the communication setting 3 illustrated in FIG. 11 as the communication condition. In S1213, the album creation application sets the communication setting 4 illustrated in FIG. 11 as the communication condition.

The subsequent processing is similar to that according to those described in the first and the second exemplary embodiments. In other words, the album creation application performs the communication retry processing according to the set communication condition. Also, according to the present exemplary embodiment, in view of the degree of effect on the user in this way, changing the communication condition for the target communication processing enables performing the communication retry processing according to the target communication processing. This makes it possible to prevent the resources of the terminal from being consumed by the retry processing itself and the accompanying battery consumption.

According to the present exemplary embodiment, the degree of effect is changed according to not only the user operation type at the time of album update information transmission related to a push notification, but also the situations of other albums under editing when the user operation is performed. This makes it possible to reduce the difference between the user's operation status and the push notification operation.

A fourth exemplary embodiment will be described below. The present exemplary embodiment differs from the third exemplary embodiment in the following two points. As to the first point, when the application on the terminal (smartphone 100) performs album update information transmission related to a push notification, information recorded in the management server 120 or equivalent information is also stored in the terminal. As to the second point, when the communication condition is set, the information stored in the terminal is used as one determination criterion. Configurations other than the above-described two points are similar to those according to the third exemplary embodiment, and redundant descriptions thereof will be omitted.

According to the present exemplary embodiment, referring to the table illustrated in FIG. 9A, the album creation application determines the communication condition in consideration of the degree of effect based on "USER OPERATION AT UPDATE INFORMATION TRANSMISSION", "NUMBER OF ALBUMS UNDER EDITING AFTER USER OPERATION", "DATA/TIME OF ALBUM OPERATED", and "DATE/TIME RECORDED IN MANAGEMENT SYSTEM?" (i.e., whether the date/time is recorded in the management system). In other words, according to the present exemplary embodiment, the album creation application determines the communication condition based on the classification of the nine different cases illustrated in FIG. 9A. The cases of No. 1 to No. 9 and the degrees of effect illustrated in FIG. 9A are similar to those according to the second exemplary embodiment, and redundant descriptions thereof will be omitted.

<Communications Processing Flow>

Figure 13:
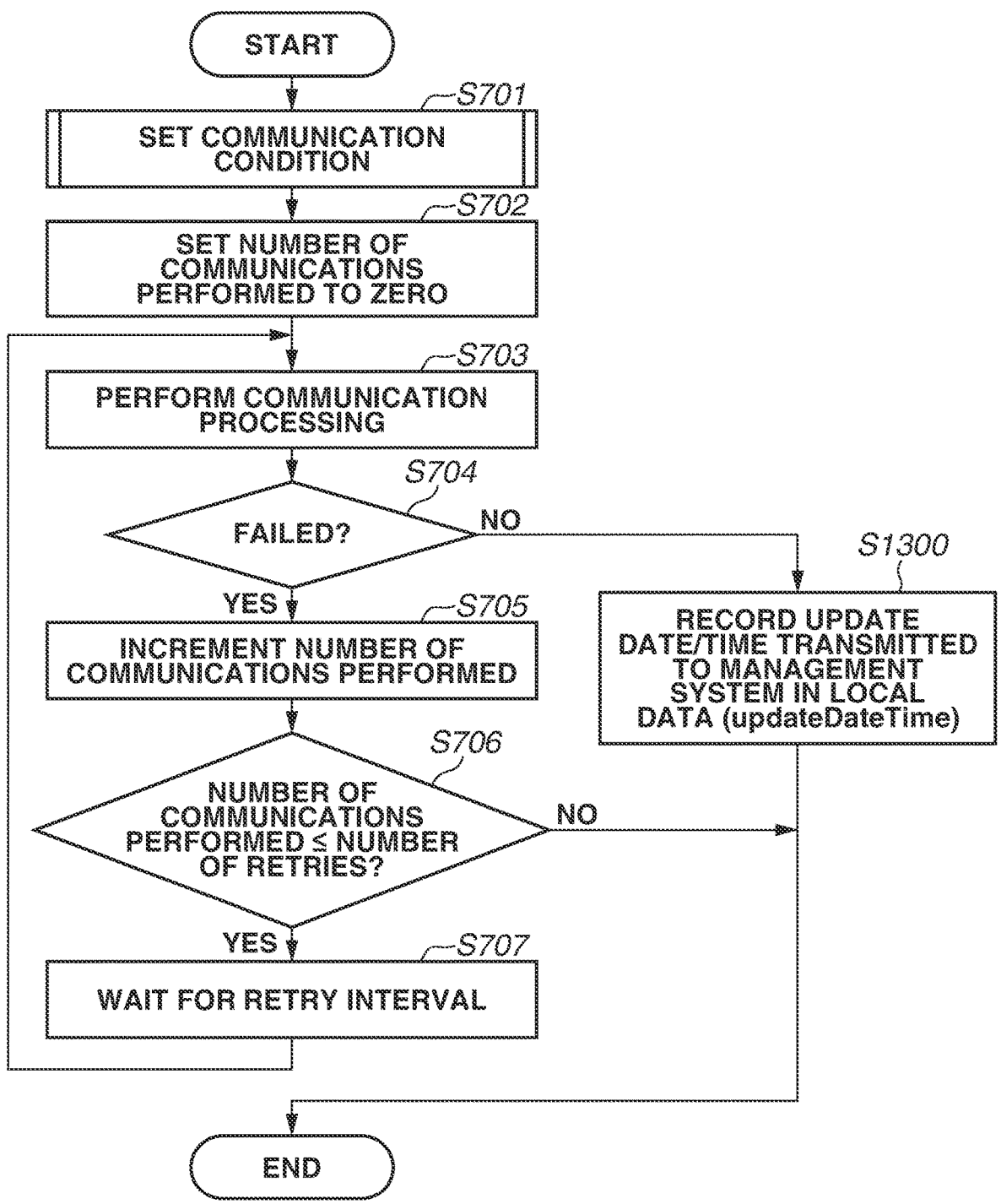
FIG. 13 is a flowchart illustrating the communication processing.
Figure 14:
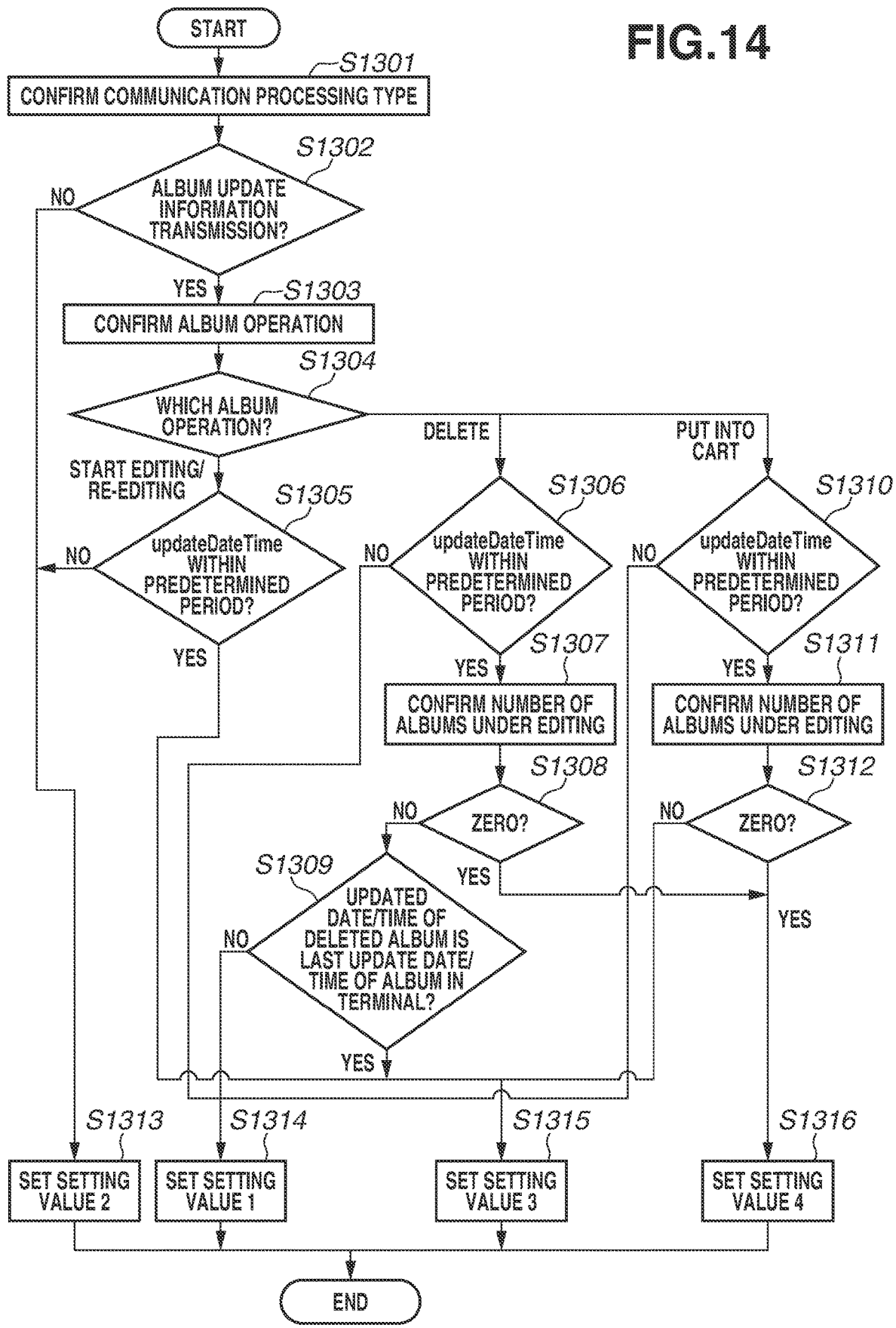
FIG. 14 is another flowchart illustrating the communication parameter setting.

The communication processing according to the present exemplary embodiment will be described below. The basic communication processing flow according to the present exemplary embodiment is described with reference to the flowchart illustrated in FIG. 13. Referring to FIG. 13, S701 to S707 are similar to those illustrated in FIG. 7A. The sub-flowchart for S701 is illustrated in FIG. 14. In other words, the flow of processing in the present exemplary embodiment is similar to that described in the third exemplary embodiment except the sub-flowchart for S701 and the processing in S1300, so that redundant descriptions of common portions will be omitted.

Referring to FIG. 13, according to the present exemplary embodiment, in S704, when the album creation application determines that the communication processing performed in S703 is successful (NO in S704), the processing proceeds to S1300.

In S1300, when the transmission processing in S703 is album update information transmission, the album creation application performs processing for storing the date/time information (transmitted album update information) as the value of the UpdateDateTime variable in the storage device 108 of the smartphone 100.

The sub-flowchart for S701 will be described below with reference to the flowchart illustrated in FIG. 14.

In S1301, the album creation application confirms the communication processing type. This processing is similar to the processing in S711 illustrated in FIG. 7B, the processing in S1001 illustrated in FIG. 10, and the processing in S1201 illustrated in FIG. 12 according to the first to the third exemplary embodiments, respectively. In S1302, the album creation application determines whether the communication processing type is album update information transmission. When the communication processing type is album update information transmission (YES in S1302), the processing proceeds to S1303. On the other hand, when the communication processing type is not album update information transmission (NO in S1302), the processing proceeds to S1313.

In S1303, the album creation application confirms the user operation at the time of album update information transmission. This processing is similar to the processing in S1003 illustrated in FIG. 10 and the processing in S1203 illustrated in FIG. 12 according to the second and the third exemplary embodiments, respectively.

In S1304, the album creation application performs determination processing based on the user operation confirmed in S1303. When the user operation is "START EDITING/RE-EDITING", the processing proceeds to S1305. When the user operation is "DELETE", the processing proceeds to S1306. When the user operation is "PUT INTO CART", the processing proceeds to S1310.

In S1305, referring to the value of the UpdateDateTime variable as update date/time information recorded in the album creation application, the album creation application determines whether the elapsed time up to the current date/time is equal to or less than a predetermined period. When the elapsed time is equal to or less than the predetermined period (YES in S1305), the processing proceeds to S1315. When the elapsed time exceeds the predetermined period (NO in S1305), the processing proceeds to S1313.

In S1306, like S1305, based on the value of the UpdateDateTime variable, the album creation application determines whether the elapsed time up to the current date/time is equal to or less than the predetermined period. When the elapsed time is equal to or less than the predetermined period (YES in S1306), the processing proceeds to S1307. On the other hand, when the elapsed time exceeds the predetermined period (NO in S1306), the processing proceeds to S1314.

In S1307, the album creation application confirms the number of albums under editing at the timing.

In S1308, the album creation application determines whether the number of albums confirmed in S1307 is zero. When the number of albums is zero (YES in S1308), the processing proceeds to S1316. On the other hand, when the number of albums is not zero (NO in S1308), the processing proceeds to S1309.

In S1309, the album creation application compares the update date/time of the album on which the DELETE operation is performed with the update date/times of albums under editing recorded in the terminal. When the update date/time of the deleted album under editing is the latest update date/time, i.e., when the album having the latest update date/time is deleted (YES in S1309), the processing proceeds to S1315. On the other hand, when the update date/time of the deleted album under editing is not the latest update date/time (NO in S1309), the processing proceeds to S1314.

Although not illustrated, according to the present exemplary embodiment, when the DELETE operation is performed, the album creation application stores the update date/time of the deleted album in the RAM 102. The update date/time remains stored in the RAM 102 until the processing in S1309 is completed.

In S1310, like S1305, based on the value of the UpdateDateTime variable, the album creation application determines whether the elapsed time up to the current date/time is equal to or less than the predetermined period. When the elapsed time is equal to or less than the predetermined period (YES in S1310), the processing proceeds to S1311. On the other hand, when the elapsed time exceeds the predetermined period (NO in S1310), the processing proceeds to S1314.

In S1311, the album creation application confirms the number of albums under editing at the time.

In S1312, the album creation application determines whether the number of albums confirmed in S1311 is zero. When the number of albums is zero (YES in S1312), the processing proceeds to S1316. On the other hand, when the number of albums is not zero (NO in S1312), the processing proceeds to S1315.

In S1313, the album creation application sets the communication setting 2 illustrated in FIG. 11 as the communication condition. In S1314, the album creation application sets the communication setting 1 illustrated in FIG. 11 as the communication condition. In S1315, the album creation application sets the communication setting 3 illustrated in FIG. 11 as the communication condition. In S1316, the album creation application sets the communication setting 4 illustrated in FIG. 11 as the communication condition.

The subsequent processing is similar to that according to the first and the second exemplary embodiments. In other words, the album creation application performs the communication retry processing according to the set communication condition.

According to the present exemplary embodiment, the album creation application considers whether date/time information has already been recorded in the management server 120 as album update information at the timing of the user operation. The album creation application determines whether the date/time information has already been recorded in the management server 120 based on the album update information recorded in S1300 illustrated in FIG. 13. When the date/time information exceeds the predetermined period, the management server 120 issues a push notification request and deletes the recorded date/time information. Therefore, referring to the date/time information recorded by the application, the album creation application determines that the date/time information is also recorded in the management server 120 if the elapsed time up to the current date/time does not exceed the predetermined period. On the other hand, when the elapsed time exceeds the predetermined period or the date/time information is not recorded in the album creation application, the album creation application determines that the date/time information is not recorded in the management server 120, either.

Also according to the present exemplary embodiment, in view of the degree of effect on the user in this way, changing the communication condition for the target communication processing enables performing the communication retry processing according to the target communication processing. This makes it possible to prevent the resources of the terminal from being consumed by the retry processing itself and the accompanying battery consumption.

Further, according to the present exemplary embodiment, when the communication processing is successful, the album creation application records the transmitted album update information in the user's local terminal and refers to the recorded information when setting a condition for the following communication processing. This makes it possible to reduce the difference between the user's operation status and the push notification operation.

A fifth exemplary embodiment will be described below. The present exemplary embodiment will be described below centering on an example in which, instead of a push notification, a notification about a function of the album creation application is transmitted. The system configuration, photo album data ordering, photo album application operations, application screen flow, and album upload processing according to the present exemplary embodiment are similar to those according to the first exemplary embodiment, so that redundant descriptions thereof will be omitted.

The album creation application according to the present exemplary embodiment has a notice function, a stamp function, and a stamp update function which are not described in the first exemplary embodiment. The present exemplary embodiment will be described in detail below.

The album creation application according to the present exemplary embodiment has a message function of downloading a notice file stored in the management server 120 and displaying the notice on the display apparatus 106 of the smartphone 100. FIG. 15 is a flowchart illustrating processing for acquiring a notice file from the management server 120. When the album creation application is activated, the processing illustrated in FIG. 15 is performed.

In S1501, the album creation application makes an inquiry about a list of notice files stored in the management server 120 to the management server 120 and then acquires the list.

In S1502, the album creation application compares the list of notice files acquired from the management server 120 with notice files which have already been acquired by the album creation application and recorded in the ROM 103. When there is any unacquired file (YES in S1502), the processing proceeds to S1503. On the other hand, when there are no unacquired files (NO in S1502), the processing in the flowchart is ended.

In S1503, the album creation application downloads an unacquired notice file and records the file in the ROM 103.

Figure 16A:
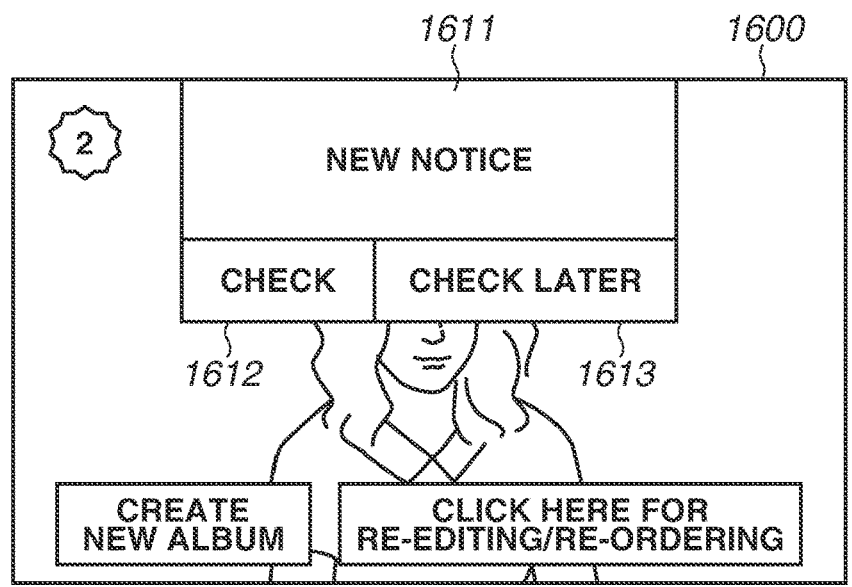
FIGS. 16A, 16B, and 16C illustrate display screens related to notices.

In S1504, the album creation application displays a pop-up message 1611 "NEW NOTICE" illustrated in FIG. 16A. Then, the processing in the flowchart is ended.

Figure 16B:
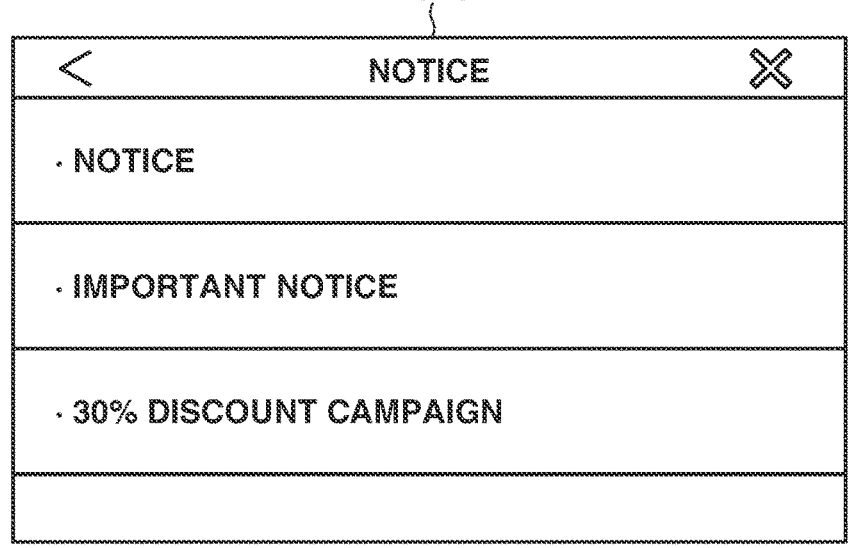
Figure 16C:
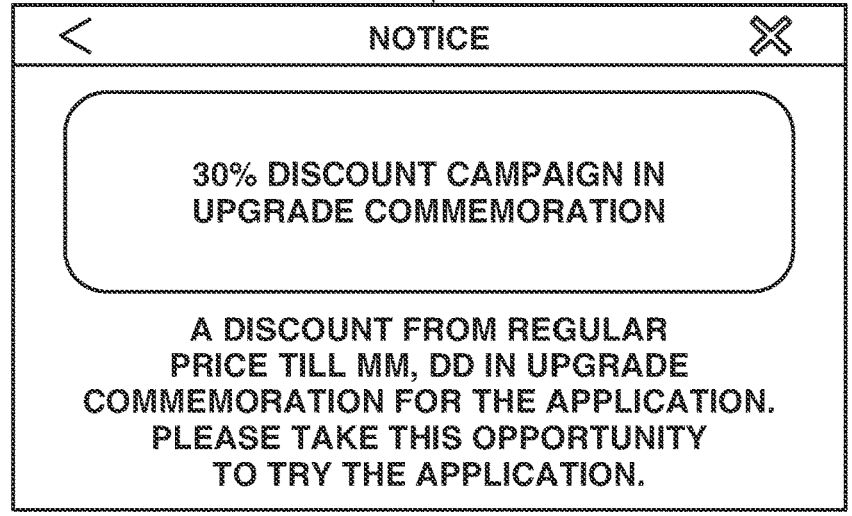

FIGS. 16A to 16C schematically illustrate screens related to the notice. FIG. 16A illustrates a screen 1600 in which the pop-up message 1611 is displayed at the timing when a new notice file is acquired. When the user presses a "CHECK" button 1612, the current screen transitions to a screen 1610 illustrated in FIG. 16B. When the user presses a "CHECK LATER" button 1613, the pop-up message 1611 closes and the screen returns to the previous screen. FIG. 16B illustrates the screen 1610 displaying a notice list. When the user selects any one of the listed notices, the text of the selected notice is displayed, as illustrated by the screen 1620 in FIG. 16C.

Figure 17A:
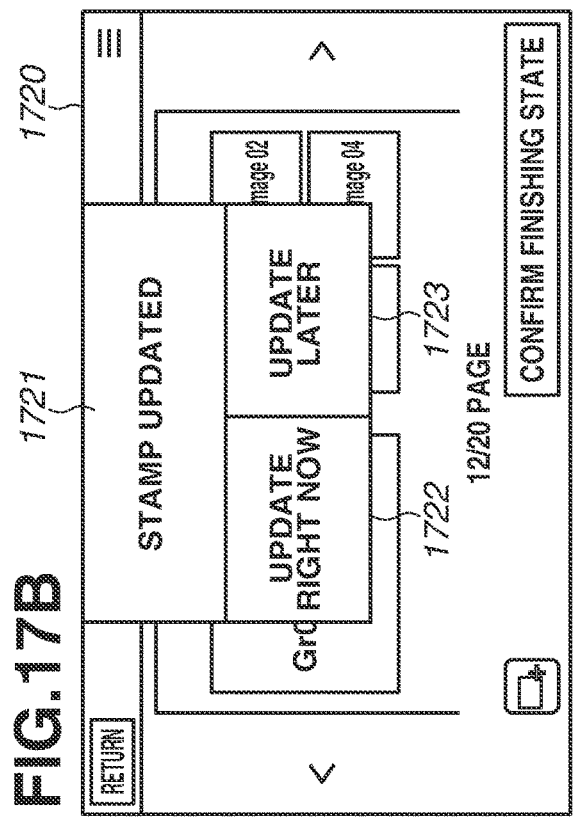
FIGS. 17A, 17B 17C, and 17D illustrate display screens related to stamp update.

The album creation application according to the present exemplary embodiment has a stamp function as one of album editing functions. The stamp function enables attaching a prepared image at an arbitrary position of an album. When the user presses a stamp button 354 in the album editing screen 350, a stamp selection screen 1710 illustrated in FIG. 17A is displayed. A stamp category list 1711 is displayed on the left-hand side of the screen 1710, and a stamp list 1712 of the selected category is displayed on the right-hand side of the screen 1710. When the user selects a stamp and presses an OK button 1713, the screen returns to the screen 330, and, at this time, the selected stamp is attached on the album. Stamps are collectively stored for each category on the management server 120 and are irregularly updated with additional stamps. The album creation application makes an inquiry to the management server 120 to confirm whether stamps have been updated. When the user presses a Cancel button 1714, the screen returns the previous screen.

Figure 18:
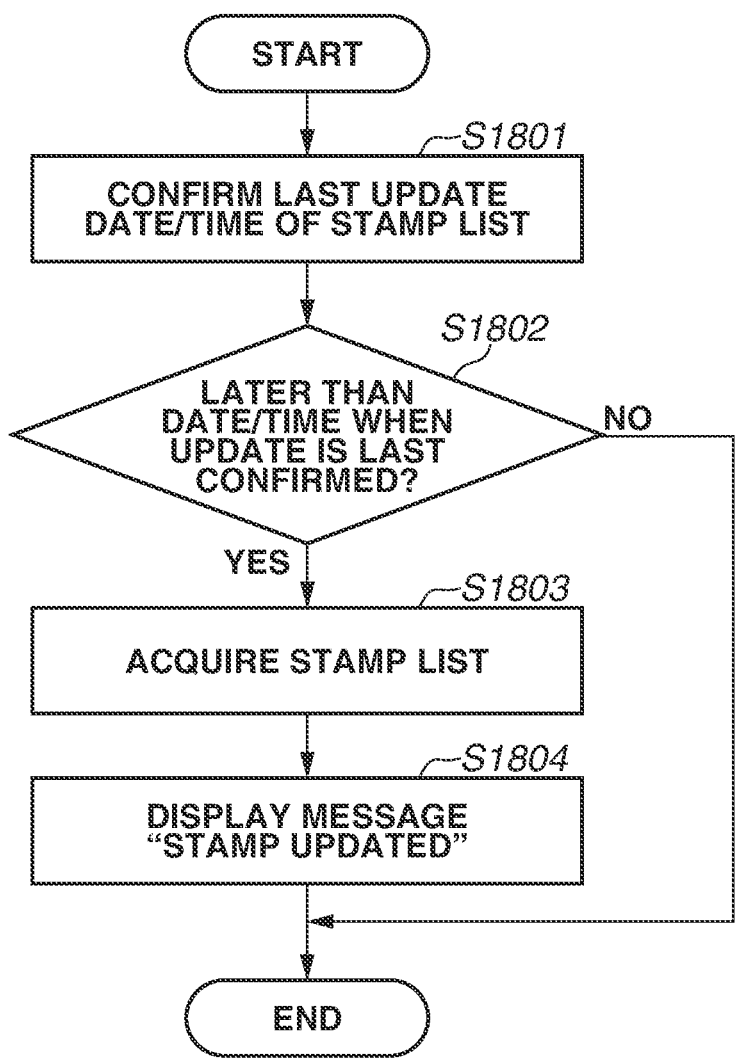
FIG. 18 is a flowchart illustrating the stamp update.

FIG. 18 is a flowchart illustrating processing performed by the album creation application to update stamps. The processing illustrated in FIG. 18 is performed at the timing when the album creation application changes causes the current screen to transition to the album editing screen 350.

In S1801, the album creation application acquires the last update date/time of the stamps recorded in the management server 120.

In S1802, the album creation application compares the last update date/time acquired from the management server 120 with the last update date/time which is last acquired by the album creation application and recorded in the ROM 103. When the last update date/time is later than the date/time when the update is last confirmed (YES in S1802), the processing proceeds to S1803. On the other hand, when the last update date/time is not later than the date/time when the update is last confirmed (NO in S1802), the processing in the flowchart is ended. The album creation application records the acquired last update date/time in the ROM 103.

In S1803, the album creation application acquires a category list of acquirable stamps and records the list in the RAM 102.

Figure 17B:
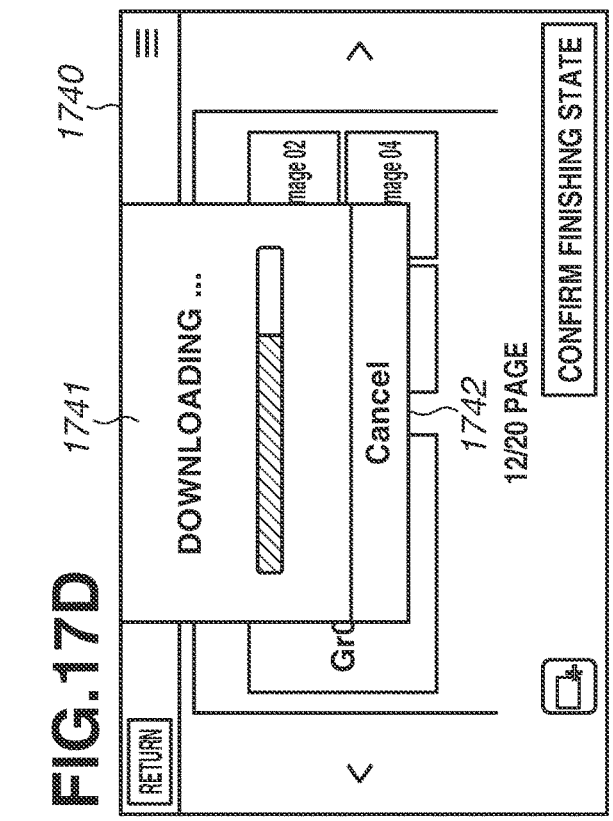

In S1804 the album creation application displays a pop-up message 1721 including a message "STAMP UPDATED" illustrated in FIG. 17B. When the user presses an "UPDATE RIGHT NOW" button 1722 in the pop-up message 1721, the current screen transitions to a screen 1730 illustrated in FIG. 17C. When the user presses an "UPDATE LATER" button 1723, the pop-up message 1721 disappears and the screen returns to the previous screen.

Figure 17C:
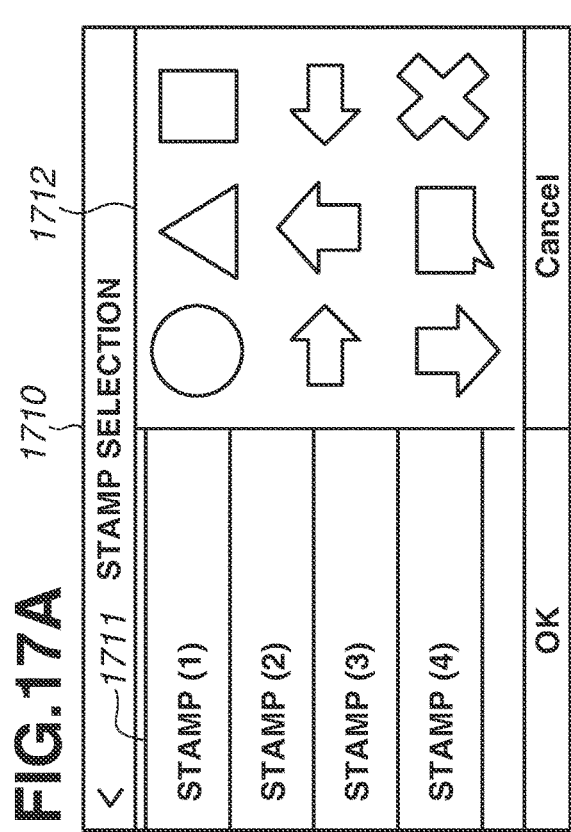
Figure 17D:
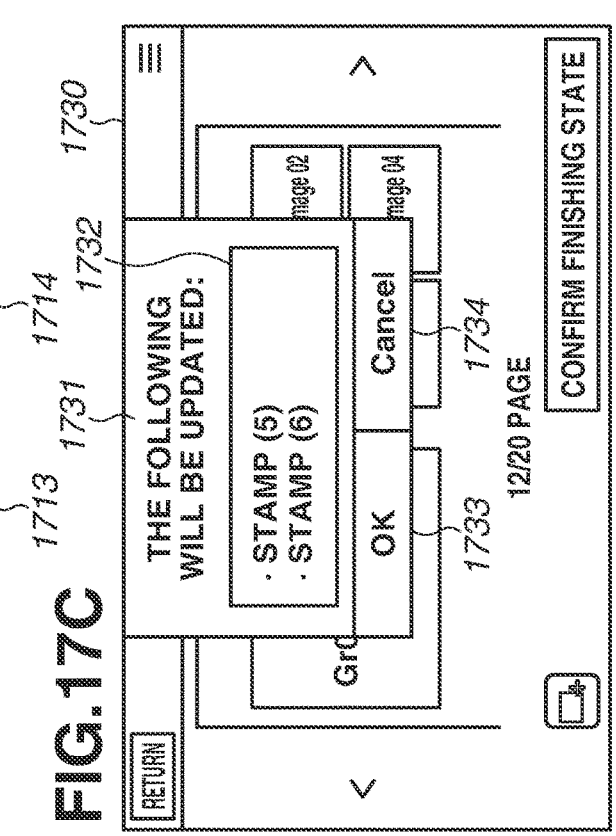

In the screen 1730 illustrated in FIG. 17C, a text "THE FOLLOWING WILL BE UPDATED:" is displayed in a pop-up message 1731. As a result of comparing the stamp category list acquired in S1803 illustrated in FIG. 18 with the stamp categories stored in the ROM 103, a stamp category list 1732 of stamp categories that are determined to be unacquired is displayed. When the user presses an OK button 1733, a screen 1740 illustrated in FIG. 17D is displayed. When the user presses a Cancel button 1734, the pop-up message 1731 disappears and the screen returns the previous screen.

FIG. 17D illustrates the screen 1740 displaying a pop-up message 1741 indicating that the stamps are currently being downloaded. When downloading is completed or when the Cancel button 1742 is pressed during downloading, the pop-up message 1741 disappears and the previous screen is redisplayed.

The degree of effect when various communications are disabled because of a temporary communication failure will be described below. FIG. 19 is a table illustrating the degree of effect on the user when various communications are disabled according to the present exemplary embodiment.

If any one of album uploading target URL acquisition, album data uploading, shopping cart URL acquisition, and stamp downloading has failed, an error message is displayed. In these cases, since the user can recognize the situation and the user's confusion is assumed to be small, the degree of effect is set to "LOW".

Meanwhile, in the cases of notice list acquisition and notice downloading, an important notice, such as server deactivation information and failure information, may not possibly be delivered to the user. In these cases, since the user's confusion is assumed, the degree of effect is set to "HIGH".

If stamp data last update date/time acquisition or stamp list acquisition has failed, the user cannot even know that the stamps have been updated. In this case, therefore, the degree of effect is set to "MIDDLE".

The communication processing flow performed by the album creation application according to the present exemplary embodiment will be described with reference to the flowchart illustrated FIG. 7A according to the first exemplary embodiment. However, in the communication condition setting in S701 illustrated in FIG. 7A, the album creation application uses the settings illustrated in FIG. 19 without using the flowchart illustrated in FIG. 7B. For example, referring to FIG. 19, the album creation application sets the communication setting 2 illustrated in FIG. 11 for communication with the "LOW" degree of effect, sets the communication setting 3 illustrated in FIG. 11 for communication with the "MIDDLE" degree of effect, and sets the communication setting 4 illustrated in FIG. 11 for communication with the "HIGH" degree of effect. Other processing is similar to that according to the first exemplary embodiment.

According to the present exemplary embodiment, in view of the degree of effect on the user in this way, changing the communication condition for the target communication processing enables performing the communication retry processing according to the target communication processing. This makes it possible to prevent the resources of the terminal from being consumed by the retry processing itself and the accompanying battery consumption.

Other Exemplary Embodiments

The above-described exemplary embodiments are based on the album creation application for creating album data by laying out image data (photographs) on a template, as an example of an application. However, the application is not limited thereto. For example, an application for creating poster and postcard data by using image data is also applicable. In other words, the above-described exemplary embodiments are applicable to various applications for editing and deleting image data and uploading image data to an external server.

Some embodiment(s) can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has described exemplary embodiments, it is to be understood that some embodiments are not limited to the disclosed exemplary embodiments. The scope of the following claims is to be accorded the broadest interpretation so as to encompass all such modifications and equivalent structures and functions.

This application claims priority to Japanese Patent Application No. 2018-142386, which was filed on Jul. 30, 2018 and which is hereby incorporated by reference herein in its entirety.

What is claimed is:

1. A method for controlling an information processing apparatus, the method comprising:
   editing image data;
   uploading the edited data to a management server;
   setting a communication retry condition based on a type of a user operation; and
   performing communication for transmitting updating information based on the user operation,
   wherein, in a case where the communication based on the user operation has failed, a communication retry is performed based on the set communication retry condition, and
   wherein, in a case where a first user operation related to the editing of the image data and a second user operation related to the uploading are respectively performed, a number of communication retries for communication based on the second user operation is larger than a number of communication retries for communication based on the first user operation.

2. The control method according to claim 1,
   wherein the information processing apparatus is capable of communicating with the management server and a notification server via a network,
   wherein, in a case where the first user operation is performed, communication for transmitting date/time information related to the first user operation, as the updating information, to the management server is performed, and
   wherein, based on the date/time information related to the first user operation transmitted from the information processing apparatus, the management server issues a notification request to the notification server if a predetermined notification condition is satisfied, and a notification based on the notification request is transmitted from the notification server to the information processing apparatus.

3. The control method according to claim 2, wherein the communication retry condition is set in relation to a degree of effect related to the notification transmitted from the notification server.

4. The control method according to claim 2, wherein, in a case where the second user operation is performed, communication for transmitting the updating information related to the second user operation, to the management server is performed, and
   wherein, based on the updating information related to the second user operation transmitted from the information processing apparatus, the management server issues a notification request to the notification server if a predetermined notification condition is satisfied, and a notification based on the notification request is transmitted from the notification server to the information processing apparatus.

5. The control method according to claim 1, further comprising:
   deleting the edited data,
   wherein, in a case where the first user operation related to the editing of the image data is performed and a third user operation related to deletion of the edited data is performed respectively, a number of communication retries in communication based on the third user operation is larger than a number of communication retries in communication based on the first user operation.

6. The control method according to claim 1, wherein the communication retry condition differs between a case where, after the second user operation related to the uploading is performed, data that is different from the uploaded data and on which the editing has been started is stored in the information processing apparatus and a case where, after the second user operation related to the uploading is performed, the data on which the editing has been started is not stored in the information processing apparatus.

7. The control method according to claim 6, wherein the communication retry condition differs between a case where, after a third user operation related to deletion of the edited image data is performed, data that is different from the deleted data and on which the editing has been started is stored in the information processing apparatus and a case where, after the third user operation related to the deletion is performed, the data on which the editing has been started is not stored in the information processing apparatus.

8. The control method according to claim 1, wherein the communication retry condition differs between a case where, at a timing when the first user operation related to the editing is performed, the updating information is stored in the management server and a case where, at the timing when the first user operation related to the editing is performed, the updating information is not stored in the management server.

9. An information processing apparatus comprising:
   at least one processor causing the information processing apparatus to act as:
   an editing unit configured to edit image data;
   an uploading unit configured to upload the edited data to a management server,
   a setting unit configured to set a communication retry condition based on a user operation type; and
   a communication unit configured to perform communication for transmitting updating information based on the user operation,
   wherein, in a case where communication based on the user operation has failed, the communication unit performs a communication retry based on the set communication retry condition, and
   wherein, in a case where a first user operation relating to the editing of the image data and a second user operation relating to the uploading are respectively performed, a number of communication retries for communication based on the second user operation is larger than a number of communication retries for communication based on the first user operation.

10. The information processing apparatus according to claim 9,
wherein the information processing apparatus is capable of communicating with the management server and a notification server via a network,
wherein, in a case where the first user operation is performed, communication for transmitting date/time information related to the first user operation, as the updating information, to the management server is performed, and
wherein, based on the date/time information related to the first user operation transmitted from the information processing apparatus, the management server issues a notification request to the notification server if a predetermined notification condition is satisfied, and a notification based on the notification request is transmitted from the notification server to the information processing apparatus.

11. The information processing apparatus according to claim 10, wherein the communication retry condition is set in relation to a degree of effect related to the notification transmitted from the notification server.

12. The information processing apparatus according to claim 10, wherein, in a case where the second user operation is performed, the communication unit transmits the updating information related to the second user operation to the management server, and
wherein, based on the updating information related to the second user operation transmitted from the information processing apparatus, the management server issues a notification request to the notification server if a predetermined notification condition is satisfied, and a notification based on the notification request is transmitted from the notification server to the information processing apparatus.

13. The information processing apparatus according to claim 9, further comprising:
a deletion unit configured to delete the edited data,
wherein, in a case where the first user operation related to the editing of the image data is performed and a third user operation related to the deletion of the edited data is performed, a number of communication retries in communication based on the third user operation is larger than a number of communication retries in communication based on the first user operation.

14. The information processing apparatus according to claim 9, wherein the communication retry condition differs between a case where, after the second user operation related to the uploading is performed, data that is different from the uploaded data and on which the editing has been started is stored in the information processing apparatus and a case where, after the second user operation related to the uploading is performed, the data on which the editing has been started is not stored in the information processing apparatus.

15. The information processing apparatus according to claim 14, wherein the communication retry condition differs between a case where, after a third user operation related to deletion of the edited image data is performed, data that is different from the deleted data and on which the editing has been started is stored in the information processing apparatus and a case where, after the third user operation related to the deletion is performed, the data on which the editing has been started is not stored in the information processing apparatus.

16. The information processing apparatus according to claim 9, wherein the retry condition differs between a case where, at a timing when the first user operation related to the editing is performed, the updating information is stored in the management server and a case where, at the timing when the first user operation related to the editing is performed, the updating information is not stored in the management server.

* * * * *